US010936555B2

(12) United States Patent
Oberle

(10) Patent No.: US 10,936,555 B2
(45) Date of Patent: Mar. 2, 2021

(54) AUTOMATED QUERY COMPLIANCE ANALYSIS

(71) Applicant: SAP SE, Walldorf (DE)

(72) Inventor: Daniel Oberle, Durmersheim (DE)

(73) Assignee: SAP SE, Walldorf (DE)

( * ) Notice: Subject to any disclaimer, the term of this patent is extended or adjusted under 35 U.S.C. 154(b) by 240 days.

(21) Appl. No.: 15/388,897

(22) Filed: Dec. 22, 2016

(65) Prior Publication Data

US 2018/0182049 A1 Jun. 28, 2018

(51) Int. Cl.
*G06F 16/20* (2019.01)
*G06F 16/2457* (2019.01)
*G06F 16/22* (2019.01)
*G06Q 50/18* (2012.01)
*G06N 5/02* (2006.01)

(52) U.S. Cl.
CPC .............. *G06F 16/20* (2019.01); *G06F 16/22* (2019.01); *G06F 16/2457* (2019.01); *G06Q 50/18* (2013.01); *G06N 5/022* (2013.01)

(58) Field of Classification Search
CPC ......... G06F 17/30312; G06F 17/30522; G06F 16/2457; G06F 16/22; G06Q 50/18
See application file for complete search history.

(56) References Cited

U.S. PATENT DOCUMENTS 6,256,640 B1 * 7/2001 Smalley ........... G06Q 10/06395
705/28
6,453,314 B1 * 9/2002 Chan ................... G06F 16/2365
6,915,265 B1 * 7/2005 Johnson ................ G06F 19/328
705/2
7,010,546 B1 * 3/2006 Kolawa ............... G06F 11/3688
707/694
7,310,647 B2 * 12/2007 Lei ...................... G06F 21/6227
7,356,545 B2 * 4/2008 Muralidharan ..... G06F 21/6227
707/694
7,401,085 B2 * 7/2008 Mackay ............. G06F 16/2471
7,734,606 B2 * 6/2010 Walker ............. G06F 17/30979
707/705
7,810,142 B2 * 10/2010 Agrawal ............... G06F 19/322
707/608

(Continued)

OTHER PUBLICATIONS

Oberle, et al., "An Ontology for Software," 20 pages, 2009. [https://userpages.unikoblenz.de/~staab/Research/Publications/2009/handbookEdition2/ontology-for-software.pdf], visited on or before Oct. 24, 2016.

(Continued)

*Primary Examiner* — Miranda Le
(74) *Attorney, Agent, or Firm* — Klarquist Sparkman, LLP

(57) ABSTRACT

Techniques and solutions are described for facilitating the determination of whether a query, such as a database query, may raise a compliance issue, such as whether restricted information associated with a particular database field is provided as an output of the query. A compliance tool receives a query that includes a plurality of query operations. At least one database field associated with a potential compliance issue is received. For example, the at least one database field may be associated with restricted information. The plurality of query operations are analyzed to determine whether information associated with the at least one database field is an output of the query to provide compliance results. The compliance results are output to a user.

19 Claims, 11 Drawing Sheets

(56) References Cited

U.S. PATENT DOCUMENTS

| | | | | |
|---|---|---|---|---|
| 7,860,842 | B2* | 12/2010 | Bronnikov | G06F 21/577 707/690 |
| 7,940,899 | B2* | 5/2011 | Moorman, III | G06Q 20/10 379/127.03 |
| 8,078,568 | B2 | 12/2011 | Stuhec et al. | |
| 8,122,050 | B2* | 2/2012 | Mordvinov | G06F 17/30424 707/769 |
| 8,332,349 | B1* | 12/2012 | Wilson | G06F 16/2358 707/607 |
| 8,375,044 | B2* | 2/2013 | Zabokritski | G06F 17/30427 707/760 |
| 8,453,255 | B2* | 5/2013 | Shulman | G06F 21/552 726/27 |
| 8,666,970 | B2* | 3/2014 | Albrecht | G06F 16/2453 707/719 |
| 8,694,551 | B2* | 4/2014 | Ramamurthy | G06F 16/21 707/802 |
| 8,768,923 | B2 | 7/2014 | Drumm et al. | |
| 8,838,964 | B2* | 9/2014 | Gregorovic | G06F 21/60 713/165 |
| 8,930,918 | B2* | 1/2015 | Tendulkar | G06F 16/21 717/134 |
| 9,087,120 | B2* | 7/2015 | Hahn | G06F 8/70 |
| 9,158,522 | B2 | 10/2015 | Nyisztor et al. | |
| 9,171,060 | B2 | 10/2015 | Oberle et al. | |
| 9,189,356 | B2* | 11/2015 | Iyer | G06F 11/302 |
| 9,258,668 | B2 | 2/2016 | Mall et al. | |
| 9,344,833 | B2 | 5/2016 | Nyisztor et al. | |
| 10,248,494 | B2* | 4/2019 | Haridas | G06F 16/10 |
| 2002/0023109 | A1* | 2/2002 | Lederer, Jr. | G06Q 10/10 715/255 |
| 2004/0177326 | A1* | 9/2004 | Bibko | G06Q 10/10 715/200 |
| 2006/0212486 | A1* | 9/2006 | Kennis | G06F 21/55 |
| 2006/0282470 | A1* | 12/2006 | Yu | G06F 16/288 |
| 2007/0192336 | A1* | 8/2007 | Iyer | G06F 16/24542 |
| 2007/0198477 | A1* | 8/2007 | Lawton | G06F 19/326 |
| 2007/0288250 | A1 | 12/2007 | Lemcke et al. | |
| 2008/0319937 | A1 | 12/2008 | Stuhec et al. | |
| 2010/0031240 | A1 | 2/2010 | Drumm et al. | |
| 2011/0078215 | A1 | 3/2011 | Oberle et al. | |
| 2013/0185187 | A1* | 7/2013 | Vasinkevich | G06Q 40/04 705/37 |
| 2013/0198138 | A1* | 8/2013 | Sambamurthy | G06F 16/219 707/648 |
| 2013/0232123 | A1* | 9/2013 | Ahmed | G06F 16/21 707/690 |
| 2014/0214809 | A1* | 7/2014 | Freire | G06F 17/30979 707/722 |
| 2014/0230070 | A1* | 8/2014 | Ramamurthy | G06F 21/554 726/26 |
| 2014/0280370 | A1 | 9/2014 | Oberle et al. | |
| 2015/0205951 | A1* | 7/2015 | Anand | G06F 17/30371 726/25 |
| 2015/0347390 | A1* | 12/2015 | Tewari | G06F 17/2775 704/9 |
| 2016/0034538 | A1 | 2/2016 | Oberle | |
| 2016/0239532 | A1* | 8/2016 | Gould | G06F 16/252 |
| 2017/0179983 | A1* | 6/2017 | Choi | H04B 1/1036 |
| 2017/0372391 | A1* | 12/2017 | Metnick | G06Q 30/0613 |
| 2018/0143826 | A1* | 5/2018 | Crabtree | G06F 8/71 |
| 2018/0165147 | A1* | 6/2018 | Debnath | G06F 11/07 |
| 2019/0080392 | A1* | 3/2019 | Youb | H04L 9/0643 |

OTHER PUBLICATIONS

Oberle, et al., "Engineering Compliant Software: Advising Developers by Automatic Legal Reasoning," *SCRIPTed*, vol. 9, No. 2, 35 pages, 2012.

Oberle, "Ontologies and Reasoning in Enterprise Service Ecosystems," *Informatik Spektrum*, vol. 37, No. 4, 13 pages, 2014.

Oberle, et al., "Towards Ontologies for Formalizing Modularization and Communication in Large Software Systems," 48 pages, Sep. 23, 2005. [http://lambda.csail.mit.edu/~chet/papers/others/o/oberle/joao2005.pdf], visited on or before Oct. 24, 2016.

Raabe, et al., "Recht ex Machina: Formalisierung des Rechts im Internet der Dienste," 476 pages, 2012.

"Building Advanced Data Models with SAP HANA. Werner Steyn Customer Solution Adoption, SAP Labs, LLC.," retrieved from http://docplayer.net/15359916-Building-advanced-data-models-with-sap-hana-werner-steyn-customer-solution-adoption-sap-labs-llc.html, on or before Dec. 2016, 28 pages.

"Eclipse Java development tools (JDT) Overview," retrieved from http://www.eclipse.org/jdt/overview.php, on or before Dec. 2016, 3 pages.

"SWT: The Standard Widget Toolkit," retrieved from https://www.eclipse.org/swt/, on or before Dec. 2016, 2 pages.

"JFace," retrieved from https://wiki.eclipse.org/JFace, on or before Dec. 2016, 12 pages.

Kumar, Pradeep, "The nerdy credentials," retrieved from http://www.slideshare.net/prady00/webservices-overview-xml-rpc-soap-and-rest, on or before Dec. 20, 2016, 37 pages.

"Team. Platform Team Repository Integration Framework. Compare Framework," retrieved from https://www.eclipse.org/eclipse/platform-team/, on or before Dec. 2016, 2 pages.

"Eclipse Workspaces: What for and why?" retrieved from http://stackoverflow.com/questions/13552266/eclipse-workspaces-what-for-and-why, on or before Dec. 2016, 4 pages.

"Eclipse (software)," retrieved https://en.wikipedia.org/wiki/Eclipse_(software), on or before Dec. 2016, 10 pages.

"Develop Applications on Integrated SUSE and SAP Platforms," retrieved from http://www.slideshare.net/SAPAppsPartner/suse-technical-webinar-build-hana-apps on or before Dec. 2016, 200 pages.

"SAP HANA Studio Part 1," retrieved from http://saphanatutorial.com/sap-hana-studio!, on or before Dec. 2016, 18 pages.

"DOLCE: a Descriptive Ontology for Linguistic and Cognitive Engineering," retrieved from http://www.loa.istc.cnr.it/old/DOLCE.html on or before Dec. 2016, 2 pages.

"Core Software Ontology Core Ontology of Software Components Core Ontology of Services," retrieved from http://www.loa.istc.cnr.it/old/DOLCE.html on or before Dec. 2016, 5 pages.

"SmarterPrivacy," retrieved from http://www.loa.istc.cnr.it/old/DOLCE.html, on or before Dec. 2016, 2 pages.

\* cited by examiner

AUTOMATED QUERY COMPLIANCE ANALYSIS

FIELD

The present disclosure generally relates to analyzing queries, such as database queries, for compliance issues. Particular implementations relate to analyzing query operations and database fields containing restricted information to determine if a query raises a potential compliance issue associated with a formalized compliance norm.

BACKGROUND

Society is becoming ever more data driven. Companies are able to track their operations at increasing levels of granularity. For individuals, as more and more of their activity takes place, or is tracked, in the digital world, their personal information is often recorded, used, shared, and sold. Even discounting nefarious activities such as hacking, phishing, malware, and viruses, a tremendous amount of information regarding individuals can be gathered through sources such as the websites an individual visits, their actions on the websites, and activity on social networks. Information stored by companies, such as banks, medical providers, and employers, can also be sensitive.

Individuals and governments are increasingly sensitive to the collection and use of personal information. Various laws have been passed to try and specify what information about an individual can be collected, how it can be collected, and how it can be used, shared, or sold. While such laws can be beneficial for individuals, it can be difficult for companies, and particularly the individuals working at companies, to be aware of all the various laws and regulations that might apply to their activities. Even if a company or employee is aware of a law or regulation, laws and regulations can be difficult to understand, and their ramifications may not be clear without additional context. Thus, even companies and employees wishing to comply with relevant laws and regulations regarding the use of personal information may find it difficult to determine whether their actions, or proposed actions, will be legally compliant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating the determination of whether a query, such as a database query, may raise a compliance issue, such as whether restricted information associated with a particular database field is provided as an output of the query. According to a particular method, a compliance tool receives a query that includes a plurality of query operations. At least one database field associated with a potential compliance issue is received. For example, the at least one database field may be associated with restricted information. The plurality of query operations are analyzed to determine whether information associated with the at least one database field is an output of the query to provide compliance results. The compliance results are output to a user.

According to another method, a plurality of query operations associated with a query are determined. At least a portion of the query operations are hierarchically related. At least one database field associated with the query and including restricted information is determined. Compliance results are calculated. The compliance results indicate whether query operations using the restricted information produce output that includes the restricted information. A visual representation of the compliance results is output for display.

In a further method, query operations associated with a query are determined. Database fields associated with the query are determined. The query operations and database fields are classified as instances of formalized subject matter. At least a portion of the formalized subject matter instances are subsumed under at least one formalized compliance term. The at least one formalized compliance term is analyzed using at least one formalized compliance norm that includes at least one formalized compliance term. A visual representation of the formalized compliance norm and associated formalized compliance term is output for display. The visual representation can indicate that the at least one formalized compliance term may be associated with a potential compliance issue.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
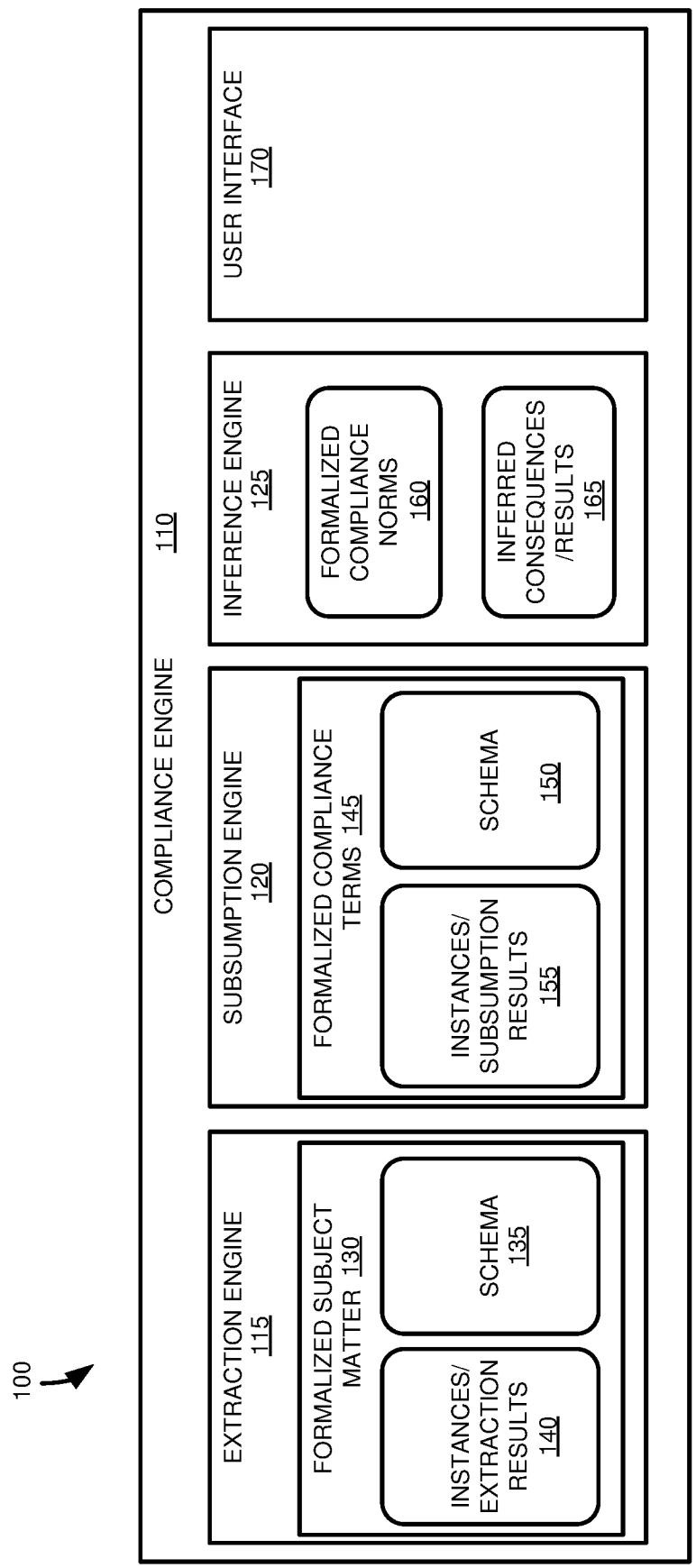
FIG. 1 is a schematic diagram illustrating how a compliance engine can be used to identify in a query possible sources of noncompliance with a formalized compliance norm according to an embodiment of the present disclosure.

Society is becoming ever more data driven. Companies are able to track their operations at increasing levels of granularity. For individuals, as more and more of their activity takes place, or is tracked, in the digital world, their personal information is often recorded, used, shared, or sold. Even discounting nefarious activities such as hacking, phishing, malware, and viruses, a tremendous amount of information regarding individuals can be gathered through sources such as the websites an individual visits, their actions on the websites, and activity on social networks. Information stored by companies, such as banks, medical providers, and employers, can also be sensitive.

Individuals and governments are increasingly sensitive to the collection and use of personal information. Various laws have been passed to try and specify what information about an individual can be collected, how it can be collected, and how it can be used, shared, or sold. While such laws can be beneficial for individuals, it can be difficult for companies, and particularly the individuals working at companies, to be aware of all the various laws and regulations that might apply to their activities. Even if a company or employee is aware of a law or regulation, laws and regulations can be difficult to understand, and their ramifications may not be clear without additional context. Thus, even companies and employees wishing to comply with relevant laws and regulations regarding the use of personal information may find it difficult to determine whether their actions, or proposed actions, will be legally compliant.

In particular cases, a software developer or programmer may create or modify a software application or program that accesses data that may be subject to legal restrictions or requirements. For example, the program may execute a query that accesses health or financial information that is protected by one or more laws or regulations. Although the innovations of the present disclosure are generally described with respect to personal data that may be subject to legal requirements, the innovations can be used with other types of legally protected or regulated information. The innovations can also be used with information that is the subject of some other type of monitoring or scrutiny, such as classified or confidential information of a company.

In some cases, such as when a developer has been working in a particular field for a significant period of time, and the software program under development is tailored to that specific field, a developer may be aware of at least some of the legal or other restrictions surrounding information that may be accessed, processed, or disseminated using the program. However, as laws and regulations are added and evolve, it can be difficult even for legal experts to be fully aware of all the rules that might apply to a particular action. In the case of less experienced developers, or software programs that are not tied to a specific use, the chance of noncompliance further increases.

Given budgets, deadlines, and staffing issues, is may be impracticable for suitably trained individuals, such as a legal expert, to review every software program in sufficient detail before it is released. A legal violation or other noncompliance may not be discovered until the software program is in use. At that point, the company responsible for the software program, and potentially its users, may be subject to liability or other consequences. For example, even if a company is not sued or otherwise subjected to legal proceedings for noncompliance, it can create public relations problems for the company, potentially costing the company customers, revenue, and investment.

The present disclosure provides for the automated identification of potential compliance issues, which can be a compliance issue with a law, regulation, or other legal requirement, or another type of regulation or policy, such as a corporate policy. These sources of potential compliance issues can be referred to as compliance sources, and can be represented as formalized compliance norms constructed from formalized compliance terms, as will be further discussed. A general framework 100 for this automated identification is provided in FIG. 1.

The present disclosure can provide various embodiments of a compliance engine, tool, component, or module 110 that can be used to determine, or assist in determining, whether a potential compliance issue may exist with an activity or proposed activity, such as query execution. The compliance engine 110 can include various components, including an extraction engine 115, a subsumption engine 120, and an inference engine 125. The extraction engine 115 analyzes one or more particular information sources, such as query operations and database fields on which they operate. The extraction results are represented as instances 140 of formalized subject matter 130 adhering to a formalized subject matter schema 135.

The instances 140 of the formalized subject matter 130 can represent the input to, output from, or processing performed by, a software program. The input may be, for example, data sources used by the software, such as particular database tables or fields thereof. Output may be information displayed or disseminated by the software program. In some cases, a particular type of input, such as a data source, may suggest that an output or use of the data implicates a compliance issue.

In other cases, the inputs to a software program or query (e.g., particular database fields), by themselves, may not be sufficient to reveal potential compliance issues associated with the software program or query. That is, processing may alter or combine information in a way that raises a potential compliance issue even if the individual data elements or data sources did not. Conversely, the processing may alter or combine information in a way that removes a potential compliance issue associated with one or more of the source data elements or data sources. For example, the health records of a particular individual may be subject to privacy laws or regulations. However, the bulk analysis of the health records of many individuals, stripped from the health records or identifying information of any particular individual, may not give rise to a potential compliance issue. In a particular aspect, some query language operations (e.g., statements in the structured query language (SQL)) can obfuscate potentially sensitive information, such as by aggregating information associated with multiple individuals in a way that individual information is no longer provided.

Some software programs may employ common elements, such as common code segments, data, data sources (e.g. tables, fields), data views, queries, data structures, methods, user interface elements, and the like. Some software programs may specify inputs (e.g., data sources), outputs (e.g., information output for display, such as query results, or transmitted to another computing device), or processing (e.g., methods, functions, remote procedure calls, application program interface calls, or query execution) in a similar manner. The extraction engine 115 specifies what elements of the software program or query may be relevant to a compliance analysis, how to identify, extract, and store such elements.

After instances of the formalized subject matter 140 are extracted and associated with the schema 135, the formalized subject matter instances can be analyzed by the subsumption engine 120. The subsumption engine 120 can attempt to subsume, or relate, instances 140 of the formalized subject matter 130 to one or more formalized compliance terms 145. As an example, the formalized subject matter 130 may include instances of the formalized subject matter term "data" (such as specified in the schema 135), such as individuals' social security numbers stored in personnel files. The extraction engine 115 can specify how to retrieve this information from a software program and map it to the schema 135 to provide instances 140 of the formalized subject matter 130.

The subsumption engine 120 can determine whether a social security number is relevant to any of the formalized compliance terms stored in, or otherwise associated with, the subsumption engine, such as using the schema 150. For example, the formalized subject matter term of "personal data" (an instance of which may be a social security number) may be associated with a formalized compliance term used in determining compliance with one or more laws, regulations, or policies. In a particular example, the subsumption engine 120 can associate the instances 140 of the formalized subject matter 130 with particular compliance terms using a schema 150 to provide instances 155 of the formalized compliance terms (also referred to as subsumption results). The instances 155 can be stored by the subsumption engine 120.

The instances 155, or subsumption results, can be processed by the inference engine 125. The inference engine 125 can analyze the subsumption results 155 to determine whether they may raise any compliance issues using formalized compliance norms 160 stored by, or otherwise associated with, the inference engine 125. The formalized compliance norms 160 may be one or more rules or sets of conditions that determine the likelihood and nature of a compliance issue. For example, the formalized compliance norms 160 may determine a compliance result 165 (e.g., "lawfulness") based on the presence of, and relationship between, various formalized compliance terms 145.

The formalized compliance norms 160 may be, for example, laws, regulations, other legal requirements, corporate policies, other types of compliance sources, or combinations thereof. In some cases, the formalized compliance norms 160 can be defined, or otherwise provided by, a domain expert, such as a legal expert. The domain expert can, e.g., formalize a norm that defines and relates various formalized compliance terms. The domain expert can, for example, define a norm graph that defines and relates various entities (e.g. formalized compliance terms), such as objects and concepts, that may be relevant to a formalized compliance norm. That is, a formalized compliance norm 160 can be described using formalized compliance terms 145. The formalized compliance norms 160 can also include rules or definitions for determining the likelihood or presence of a potential compliance issue. For instance, the formalized compliance norms 160 can specify one or more of when a compliance issue will arise, is likely to arise, could arise, is not likely to arise, or will not arise.

In the example of a social security number, the social security number may be associated with a formalized subject matter term "data" by the extraction engine 115. The extraction engine 115 may determine that this instance of data is also associated with the formalized subject matter term "external transmission." The subsumption engine 120 may subsume these formalized subject matter instances within the formalized compliance term of "transmission to third parties." The inference engine 125 can determine what compliance scenarios or norms (e.g., particular laws, regulations, policies, etc.) are implicated by, or contain, "transmission to third parties."

The inference engine 125 can determine, such as in relation to other elements of the subsumption results 155 (such as any processing performed on the social security numbers or other information transmitted along with the social security numbers) whether a compliance issue may exist. In some cases, the inference engine 125 can provide a determination of whether or not a compliance issue may exist. In other cases, the inference engine 125 may provide an indication of whether a compliance issue may exist, such as highlighting, or another visual indication, formalized compliance terms that may be of concern.

A user, such as through a user interface 170, may be provided with inferred compliance consequences or results 165. The inference results 165 can include information regarding the subsumption results 155 and relevant formalized compliance norms 160 in order for the user to make a final determination of whether a software program or query is compliant (or, whether the software program or query should or can be executed in its current form, or if changes should be made in order to improve compliance).

In some cases, information regarding the formalized compliance norms 160 can be provided to assist the user in analyzing a potential compliance issue. For example, by selecting an inference result 165, a user may be presented with information regarding a particular law, regulation, policy, etc. relating to the potential compliance issue. The information can include the relevant text, or an explanation or analysis of the text, associated with the compliance source, which may be useful for the user in understanding how the functionality of the software program may give rise to a compliance issue. In some implementations, the user interface 170 may present a user with suggested actions to address any potential compliance issue.

Example 2—Example Compliance Analysis

Figure 2:
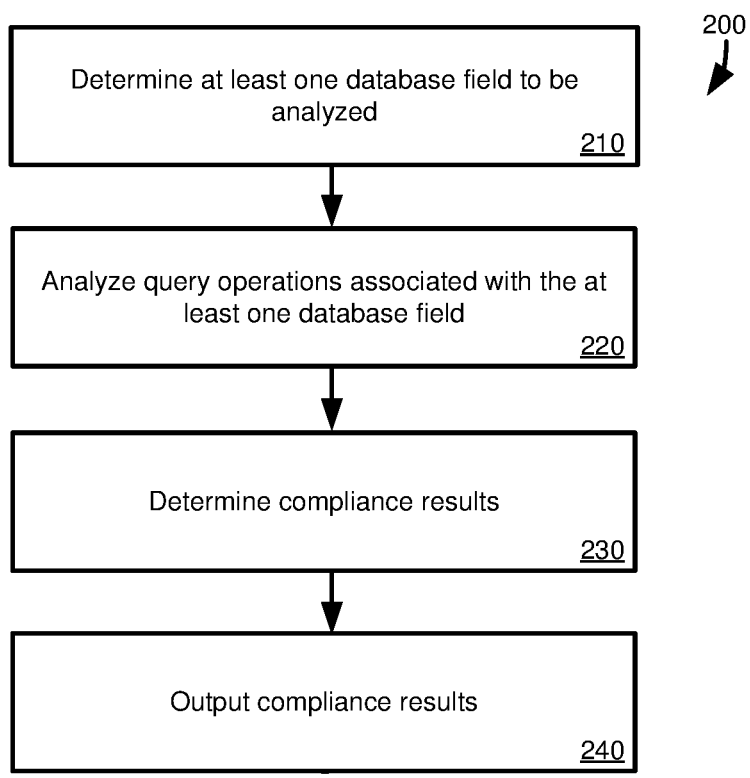
FIG. 2 is a flowchart of a method for determining query compliance results by analyzing database fields and query operations associated with a query.

FIG. 2 illustrates a flowchart of an example method 200 for carrying out a compliance analysis, such as using the framework 100 of FIG. 1. At 210, at least one database field to be analyzed is determined. In some cases, a user can provide input as to which database fields (of one or more database tables) may give rise to a potential compliance issue (e.g., which fields contain personal or other types of protected or restricted information). In other cases, the database fields (of one or more database tables) to be analyzed can be determined by comparing the fields accessed by a query (such as a query having one or more SQL statements) to a library of database fields. The library can include database fields known to potentially give rise to a compliance issue (such as containing personal or other protected information) or known not to potentially give rise to a compliance issue (such as not containing personal or other protected information).

At 220, query operations associated with the at least one database field are analyzed. The analysis can include determining whether or not the database field is processed using an obfuscation operation, an operation that results in the database field no longer potentially giving rise to a potential compliance issue, because the information is no longer provided in a sensible form. Obfuscation operations can include aggregation operations, projection operations, and transformation operations. The analysis can also include determining whether a database field was subject to an alteration operation, an operation that alters or removes the database field from the underlying data. An alteration operation can result in restricted information being present in query output even if the restricted fields from which the information originated do not appear in the query output.

Compliance results are determined at 230. The compliance results can include a warning if information associated with the at least one database field appears in query output, such as if the at least one database field was not subject to at least one obfuscation operation. The compliance results are output at 240. In some cases, the compliance results can include an analysis of formalized compliance terms (and/or instances of formalized subject matter) using at least one formalized compliance norm to provide inferred compliance results. For example, formalized compliance terms associated with the formalized compliance norms can be analyzed to determine whether a compliance norm is, or potentially may be, violated, which could lead to a compliance issue.

Example 3—Example Ontology and Formalized Subject Matter

Figure 3:
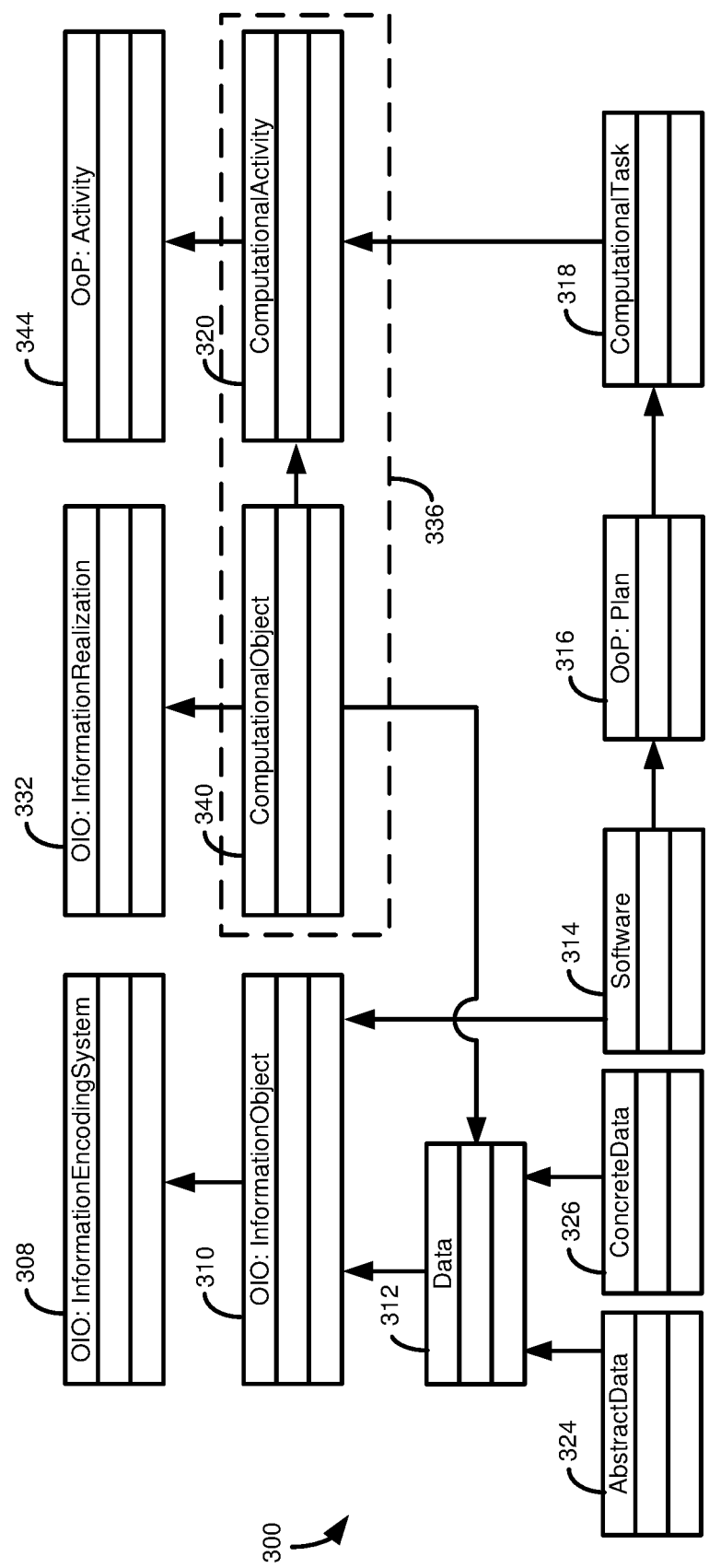
FIG. 3 is a diagram schematically depicting an ontology describing relationships between ontological elements associated with the execution of a software program, including a software program executing a query.

FIG. 3 schematically depicts an example ontology 300. The ontology 300 can be used, for instance, in the extraction engine 115 of FIG. 1, such in (or as) the schema 135. The ontology 300 is provided to help illustrate automated compliance determination, but should not be considered limiting in any way. That is, the specific components of the ontology 300, and their interrelation, may differ from that shown in FIG. 3. In addition, in at least some cases, the formalized subject matter 130 of the extraction engine 115 need not be in an ontology, or otherwise have the format shown in FIG. 3. It should be appreciated that the ontology 300 is presented as an aid for understanding the present disclosure. In practice, the ontology 300, or another representation of formalized subject matter, would normally be stored in a computer-executable format, such as code implementing the objects and relationships shown in the ontology 300.

Elements of the ontology 300 can be aligned under a set of foundational ontologies. The foundations ontologies include an Ontology of Information Objects (OIO), an Ontology of Plans (OoP), and a Descriptive Ontology for Linguistic and Cognitive Engineering (DOLCE). InformationObjects can be entities that exist in an information or computing system, as opposed to analog entities. The Ontology of Plans can be used to provide a theory of plans, generally, that can be used to characterize planning concepts, including modelling workflow information.

A member of the OIO can be InformationEncodingSystem 308, which can be used to order InformationObjects 310. For instance, the encoding of a particular class in C++ can be an InformationObject 310. The InformationObject 310 may be ordered by (e.g., the OIO:orderedBy operation) the C++ programming language, a particular InformationEncodingSystem 308. In turn, InformationObjects 310 may include Data 312 or Software 314. Software 314 can be an InformationObject 310 that expresses a Plan 316 under the OoP ontology. The Plan 316 may define a ComputationalTask 318, that in turn sequences a Computational Activity 320.

Data 312 may present information that can be manipulated, but which does not express a plan. That is, unlike Software 314, Data 312 does not direct computing activities, but rather may be the subject of computing activities. Data 312 can include AbstractData 324 and ConcreteData 326. AbstractData 324 can be data that identifies something other than itself, such as the identity of an individual. In at least some cases, AbstractData 324 (e.g., personal information of an individual) can be subject to laws, regulations, policies, or other compliance sources that may result in compliance issues. An example of ConcreteData 326 can be, for example, integers that can be manipulated (e.g., subject to mathematical operations), such as by a program.

Another element of the Ontology of Information Objects is InformationRealization 332, which can be produced by the results of a ComputationalDomain 336 formed by the interaction of a ComputationalObject 340 with a ComputationalActivity 320. The ComputationalActivity 320 can be a member of the Activity class 344 of the Ontology of Plans. A ComputationalObject 340 can represent the realization of code by execution of the code on (or embedded in) physical computing hardware. In at least some cases, ComputationalObjects 340 can also be classified as PhysicalEndurants under the DOLCE ontology, as, for example, they can be stored in a persistent storage medium (e.g., hard disk) or reside in memory.

A ComputationalObject 340 can be an instance of a class (or other object) that can be interpreted and executed by a CPU. ComputationalObjects 340 may not include, for example, a program, code, or code elements (e.g., classes, objects, or queries) that are stored (digitally or by analog means (e.g., written on paper)), or exist as an abstract concept, but are not actively running programs (e.g., programs or code in execution). ComputationalObjects 340 can realize Data 312. For example, Data 312 can serve as input or output to a ComputationalActivity 320.

A ComputationalActivity 320 can represent a running computing system, resulting from the execution of a ComputationalObject 340. A ComputationalActivity 320 can represent software as manifested by a series of computational steps, such as altering variables, receiving input, outputting information, interacting with input/output devices, and the like. In specific cases, a ComputationalActivity can include the invocation of a process carried out on a remote computing system, such as a request for a web service or other network based service (e.g., a remote procedure call (RPC), a simple object access protocol request (SOAP), or a representation state transfer request (REST)).

As explained above, the ontology 300 is provided by way of example only. However, the ontology 300 demonstrates how elements of the ontology can be mapped to particular instances of formalized subject matter to help determine whether a compliance issue may exist. For instance, a rule can be developed that indicates that compliance should be further investigated if a program or query is found to access AbstractData 324 (such as personal information, including the formalized compliance term AbstractData occurring with other instances of formalized compliance terms). Or, a rule can be defined that states that compliance should be further investigated if a program or query is found to access AbstractData 324 (or, certain types of AbstractData, such as AbstractData that may be personal information) and a ComputationalActivity 320 of transmitting the AbstractData is identified, such as by subsuming instances of formalized subject matter elements under a compliance term (such as "transmission to third parties").

In another case, a subsumption process may result in compliance needing not to be further investigated, such as if the program or query accesses AbstractData 324, but a ComputationalActivity 320 manipulates the AbstractData in a way that removes potential compliance issues (such as by aggregating the data or removing identifying information). For instance, the ComputationalActivity 320 may prevent formalized subject matter instances of AbstractData 324 from also being subsumed under a formalized compliance term of "ProtectedData."

Example 4—Example Formalized Compliance Terms and Formalized Compliance Norms

Figure 4:
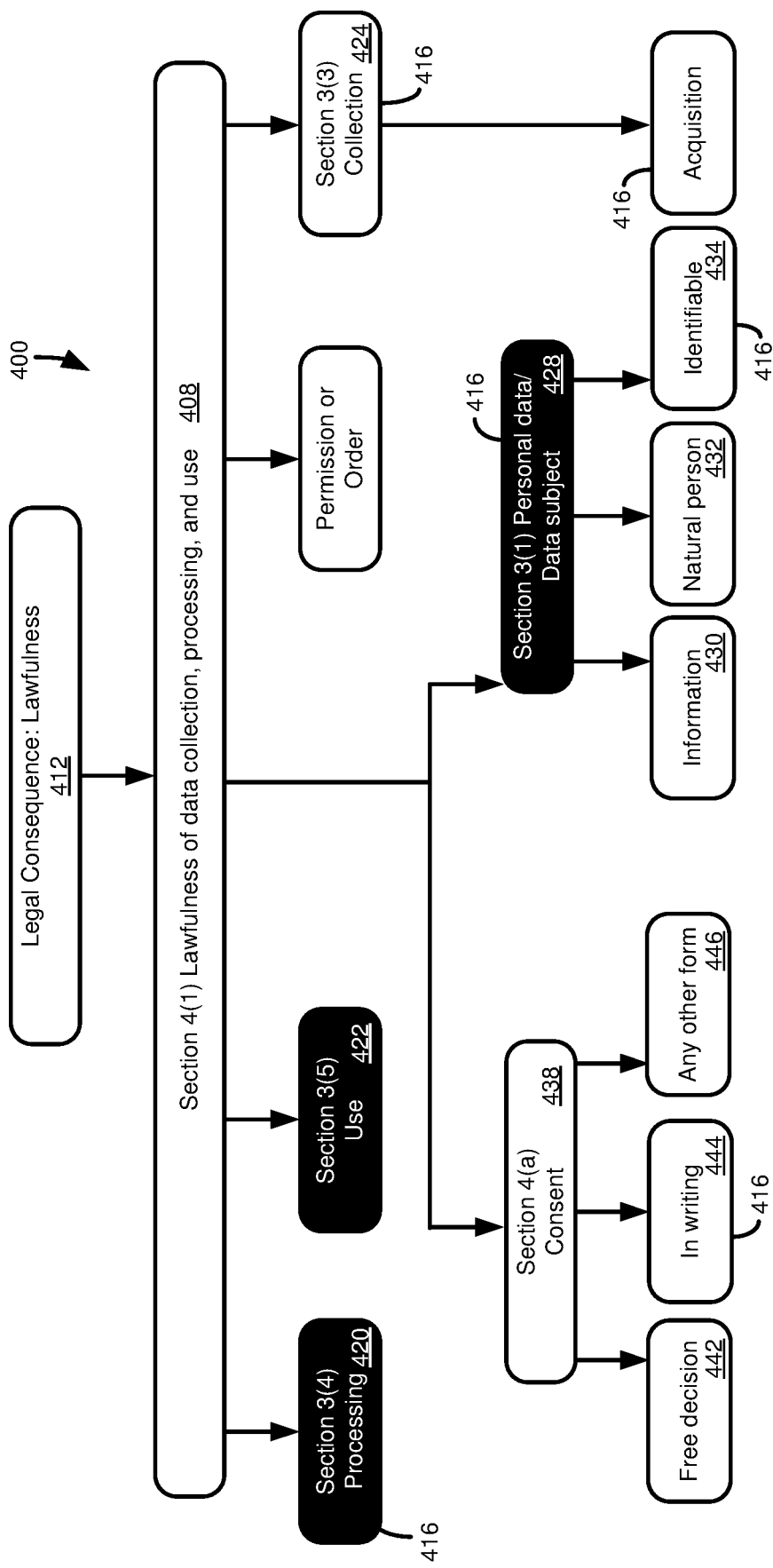
FIG. 4 is a norm graph illustrating the relation of formalized compliance terms associated with a formalized compliance norm.

FIG. 4 illustrates elements of an example formalized compliance norm 400. The formalized compliance norm 400 is a particular law or regulation 408 regarding the lawfulness of collection, processing, and use of personal data. The ultimate outcome of the formalized compliance norm 400 may be a determination of a legal consequence 412, which can be whether an activity or proposed activity (such as an activity carried out at least in part using a software program) is lawful.

The law or regulation 408 can be parsed into a number of constituent elements 416, which may be formalized compliance terms. At least a portion of these formalized compliance terms 416 can be used to subsume instances of formalized subject matter in a schema or ontology, such as the ontology 300 of FIG. 3. While, in at least some cases, inputs to, outputs from, and processing performed by a software program (collectively referred to as program information) can be directly evaluated with respect to the formalized compliance terms 416 of the formalized compliance norm, it may be advantageous to map the instances of the formalized subject matter to a schema or ontology, and then determine whether the schema elements (and their associated instances) can be subsumed under a formalized compliance term.

For example, the program information can be mapped to an ontology (representing formalized subject matter), which in turn may be subsumed under one or more formalized compliance terms. In turn, the formalized compliance terms can be analyzed using one or more formalized compliance norms to infer whether a potential compliance issue may exist. Thus, the program information can have a single mapping to the schema, rather than having to be mapped to multiple, individual formalized compliance terms or formalized compliance norms, which may use different terminology. In addition, mapping the program information to a schema or ontology can allow for greater extensibility, as formalized compliance terms and formalized norms can be added to an analysis simply by defining the appropriate subsumption schema and rules for evaluating the formalized compliance terms using the formalized compliance norm.

Returning to FIG. 4, law or regulation 408 can include formalized compliance terms representing one or more definitions. In some cases, a definition can be supplied by the law or regulation 408 itself. In other cases, the definition can be supplied from another source, such as another legal resource or a legal expert. As an example, FIG. 4 includes a definition 420 for "processing." In this example, definition 420 is supplied by Section 3(4) of the law or regulation 408. The definition may provide details about what kind of actions may constitute the kind of processing that is or is not covered by the law or regulation 408, or which may or may not give rise to a compliance issue. In at least some implementations, a definition, such as the definition 420, can be used to subsume one or more elements of formalized subject matter, such as through a schema or ontology. For example, "processing" may be associated with instances of formalized subject matter associated with the ComputationalTask 318 or ComputationalActivity 320 elements of the ontology 300 of FIG. 3. Similarly, the formalized compliance norm 400 can include definitions (formalized compliance terms 416) for "use" 422 and "collection" 424.

A formalized compliance term 416 providing a definition can, in some cases, be parsed into multiple subelements, or otherwise related to other formalized compliance terms. Definition 428 relates to the definition of personal data or a data subject (e.g., an individual associated with, such as identifiable from, personal data). The definition 428 has subelements of information 430, natural person 432, and identifiable 434. In some cases, subelements can be additional definitions provided by the law or regulation 408. In other cases, subelements can represent definitions provided by another authority or expert, or can represent particular elements that should be considered in determining whether a compliance issue may exist.

In a specific example, information 430 may be "information concerning the personal or material circumstances of an identified or identifiable individual (the data subject)." Thus, program information, instances of formalized subject matter, may not meet the definition of formalized compliance term 428 if the information does not relate to "personal or material circumstances." The definition of formalized compliance term 428 also may not be met if the information does not relate to a natural person, such as if the information relates to an entity (such as a corporation), a group of individuals, or relates to non-human subject matter.

Even if the information relates to "personal or material circumstances" and a "natural person," in order for a compliance issue to potentially be raised by the formalized compliance norm 408, information must still relate to "an identified or identifiable individual." Thus, for example, if salary data was retrieved from a database, for either a group of individuals or a particular individual, that information would not give rise to a potential compliance issue unless the name, social security number, or similar identifying information was also program information (and, even then, further analysis of the program information may reveal other reasons why a compliance issue is not raised).

Formalized compliance terms of the law or regulation 408 can, alone or in combination, be relevant to the determination of whether a compliance issue may exist. For example, in the context of the collection, processing, and use of personal data, an otherwise prohibited or regulated activity may be permitted (or regulations or restrictions removed) if the relevant individual (or another authorized person) provides "consent" 438. Instances of formalized subject matter (or program information) can be mapped to these types of formalized compliance terms 416 as well. For instance, a ComputationalObject 340 might be a class that implements a consent form, or an instance of Data 312 might be a consent flag indicating whether consent has been obtained, and this formalized subject matter subsumed under the "consent" formalized compliance term 438. Thus, rules can be defined where the presence of "consent" 438 indicates that a compliance issue is not raised, but the absence of consent indicates a potential compliance issue, or that further analysis should be undertaken.

A formalized compliance term 416 can be related to other formalized compliance terms. For example, "consent" 438 may include, or be related to, a formalized compliance term 442 representing whether consent was a free decision of the individual, a formalized compliance term 444 representing when consent should be in writing, and a formalized compliance term 446 specifying circumstances is which written consent may not be required. One or more of the formalized compliance terms 442, 444, 446 may be used to subsume formalized subject matter, such as through a schema or ontology, or directly to program information, and the formalized compliance terms evaluated using one or more rules to determine whether a compliance issue may exist. In some cases, an instance of formalized subject matter may be subsumed under more than one formalized compliance term. For example, an electronic indication of consent may be related to both "consent" 438 and "any other form" 446.

As discussed above, all or a portion of the formalized compliance terms 416 can be used to subsume program information (which can queries, including query operations, or database fields) including indirectly through formalized subject matter. In some cases, all or a portion of the mapped formalized compliance terms 416 can automatically be analyzed using one or more rules (representing one or more formalized compliance norms) to determine whether a potential compliance issue may exist. After the automatic analysis, a user may be provided with analysis results, optionally including a determination of whether a compliance issue is likely, additional considerations for evaluating a potential compliance issue, or potential actions to mitigate potential compliance issues.

In some cases, the potential relevance of all or a portion of the formalized compliance terms 416 to a potential compliance issue may be left for a user to determine. That is, in some cases, rules need not be provided, or rules provided such that an analysis of one or more formalized compliance terms 416 is performed, but an ultimate conclusion (e.g., whether or not a compliance violation exists) is not reached. A user may thus be provided with information about the program information and how it relates to the formalized compliance norm 400, from which the user can then manually determine the likelihood of a compliance issue.

Even in cases where no rules are provided, and a user manually determines the impact of program information subsumed under formalized compliance terms 416, presenting the results of the subsumption (in the format shown in FIG. 4 or some other format) can provide advantages. For example, formalizing the law, regulation, or policy giving rise to a potential compliance issue can make it easier for a user, particularly a user who is not a legal expert regarding the compliance issue, to understand how the formalized compliance terms 416 ultimately impact the compliance decision 412. Similarly, by subsuming program information (including through formalized subject matter, such as using a schema or ontology) under the formalized compliance terms 416, the user is altered to which elements of program information are associated with particular components (e.g., formalized compliance terms 416) of the formalized compliance norm 400, which can identify and narrow down the issues the individual need analyze to make their determination of whether a compliance issue is raised.

In some cases, all or a portion of the formalized compliance norm 400 can be presented to a user, such as on a display. The user may, for example, be able to view the relevant text, or an analysis or discussion of the text, of the formalized compliance norm 400 by selecting (e.g., clicking) one of the formalized compliance terms 416. Selection of a particular formalized compliance term 416 can result in a display of other content, such as one or more rules relating to the element, an analysis of one or more rules relating to the element, or a display of program information mapped to the element (optionally including an intermediate mapping to an ontology).

When presented in a display, information associated with the formalized compliance norm 400 can be presented with visual indications of the status of the formalized compliance terms 416, and the overall consequence 412. For example, formalized compliance terms 416, such as terms 420, 422, 428, under which program information has been subsumed, or which are associated with a particular rule or rule element that indicates a compliance issue may be present, may be presented in a first visual style, such as a first color. Formalized compliance terms 416, such as terms 412, 424, 430, 432, 434, 438, 442, 444, 446, that are not present, or which are associated with a particular rule indicating that a compliance issue is not present (or, at least not indicating that the issue is present), can be presented in a second visual style, such as a second color.

Formalized compliance terms 416 that have not been determined (for example, program information has been subsumed under a formalized compliance term, but a determination cannot be made (such as because other formalized subject matter needed for a subsumption operation is not present), or it cannot be determined whether program information can be subsumed under the formalized compliance term) can be presented in a third visual style, such as a third color. In this way, a user may quickly identify areas of potential safety or concern, and, optionally select formalized compliance terms 416 that are unresolved or of potential concern.

Formalized compliance norms can be used to create rules that determine whether a compliance issue may exist. For example, a rule associated with FIG. 4 might be expressed as:

((Collection(X) OR Processing (X) or Use(X))
AND
performedUpon (X,Y) AND Personal Data (Y))
AND
(Permission(P) OR Order (P)) AND givenFor (P,X))
OR
(Consent (C) AND Data Subject(D) AND about (Y,D)
    AND gives (D,C) AND
permits (C,X))
→
Lawfullness(A) AND givenFor(A,X)

Where X, Y, P, C, D, and A are variables that represent instances of the relevant formalized compliance term. For example, X can represent a particular collection and D can represent a particular data subject (e.g., an individual). These rules and relations can be implemented in code, and the variables instantiated with particular values associated with a particular software program.

Figure 5:
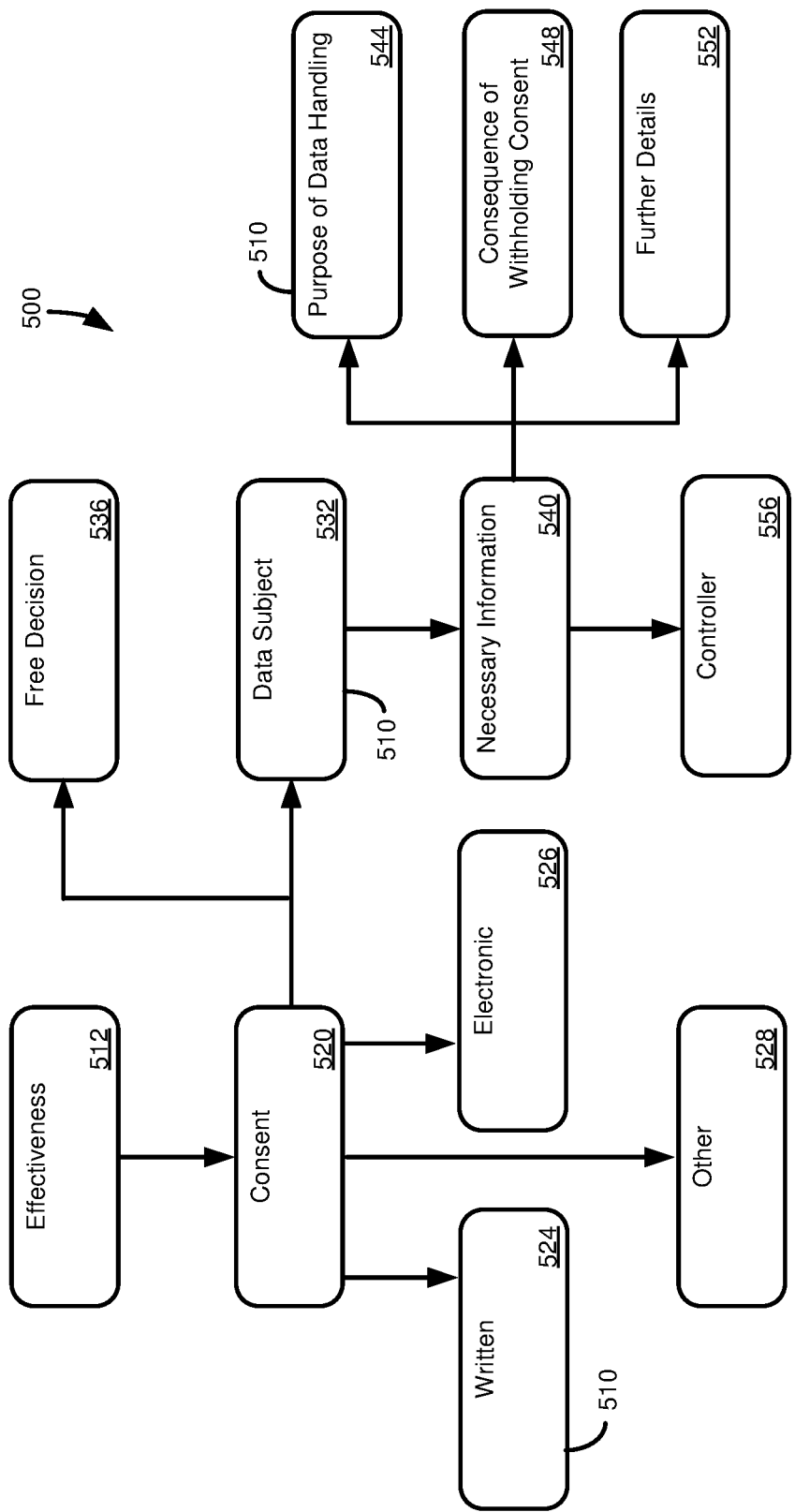
FIG. 5 is a norm graph illustrating additional details of formalized compliance terms associated with FIG. 4.

FIG. 5 presents an example view of a formalized compliance norm 500 (including component formalized compliance terms 510) that may represent, for example, more detailed, granular, or alternative information that may be presented to a user regarding the formalized compliance norm 400 of FIG. 4. For instance, the formalized compliance norm 500 may be presented when a user selects one of the formalized compliance terms 416 of FIG. 4. In particular, the formalized compliance norm 500 may represent a display presented to a user after user-selection of the "consent" term 438.

The formalized compliance norm 500 may include a plurality of formalized compliance terms 510, at least some of which may be, or be related to, one or more of the formalized compliance terms 416 of FIG. 4. In particular, "consent" term 520 may be, or be related to, "consent" term 428. The formalized compliance norm 500 may represent, for example, whether "consent" term 520 is effective, or otherwise capable of negating a potential compliance issue. The formalized compliance norm 500 may include a conclusion or outcome 512, such as whether consent has been given or whether consent is effective.

Determining whether consent exists, or is effective, may be based on a form in which consent has potentially been given. For example, it may be possible for consent to be given in written form 524, electronic form 526, or some other form 528 (e.g., visual, verbal). Whether "consent" 520 is valid may also be determined based on who the consent was potentially given by, and under what circumstances. For instance, the formalized norm 500 indicates that consent 520 should be provided by the data subject 532 (instead of, for example, an agent, guardian, parent, spouse, or the like). Formalized compliance norm 500 also indicates that consent 520 is determined based on whether the consent was a free decision 536 (as opposed to consent given under duress or compulsion).

FIG. 5 indicates additional conditions that must be met (e.g., formalized compliance terms 510 that must be present) for effective consent. The data subject 532 may need to be provided with, and understand, predicate, necessary information 540. For example, the data subject 532 may need to be informed of the purpose of the data handling 544, the consequences of providing or not providing consent 548, and any further details 552 that may be relevant to whether the data subject 532 should provide consent. In some cases, the necessary information 540 can be supplied by a controller 556.

As with the display of the formalized compliance norm 400 of FIG. 4, in at least some cases, a user may be able to obtain additional information regarding the formalized compliance norm 500 by selecting (e.g., clicking on) one of the formalized compliance terms 510. The additional information presented may include one or more of whether program information has been subsumed under the formalized compliance term 510, the relation of the formalized compliance term to one or more compliance rules, or relevant text, or a discussion of the relevant text, of a compliance source associated with the formalized compliance norm 500. Also similarly to the norm 400, a display of the formalized compliance norm 500 can display formalized compliance terms 510 in different visual styles (e.g. colors), depending on whether a formalized compliance term 510 has program information subsumed under it, is associated with a rule, or may or may not be associated with a potential compliance issue.

The views presented in FIGS. 4 and 5 can be interactive. For example, as indicated above, the compliance terms 416, 410 can have a status. In some cases, a user may wish to alter the status of a compliance term 416, 510. For example, for terms 416, 510 that were initially unknown, the user can select to alter the term status (such as by clicking on the term). The view can then change based on the user input, such as by updating other terms 416, 510, or changing a compliance conclusion associated with the graph. The user can update the view as the user attempts to gain compliance for a program, thus interactively updating the view to learn whether the software is compliant, terms 416, 510 that still give rise to noncompliance, or information on actions needed to reach compliance.

Example 5—Example Query Processing of Database Fields

Figure 6:
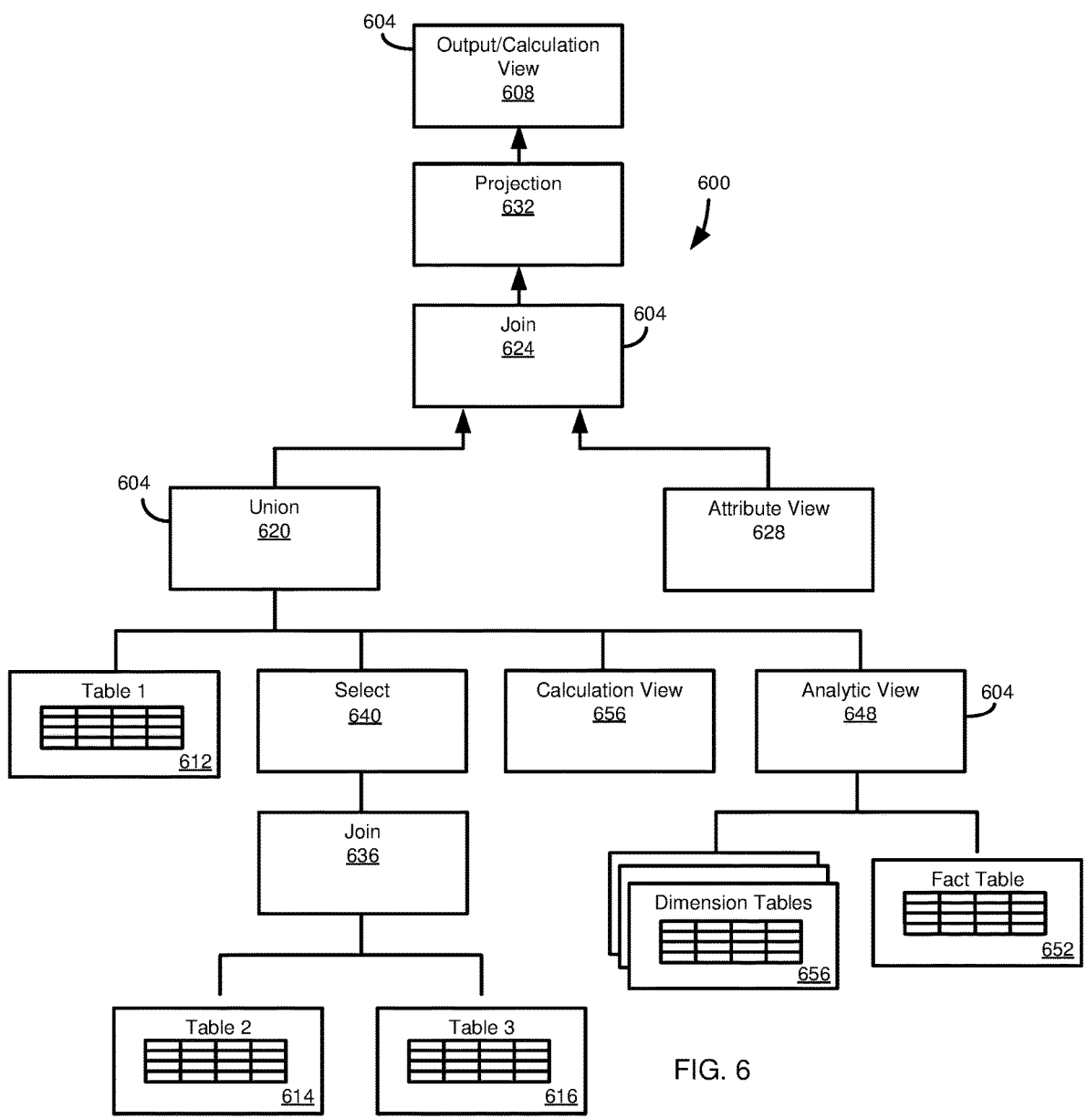
FIG. 6 is a schematic diagram depicting a query processing operation tree that includes database tables, database views, and query operations.

FIG. 6 illustrates an example query processing operation tree 600 having a plurality of query elements 604. The query processing operation tree 600 can have a hierarchical, tree structure, where query elements 604 (such as query operations, data views, and inputs, such as database tables or particular database fields) form nodes in the hierarchy. The query elements 604 include different types of views, such as attribute views, analytic views, and calculation views. These views will be further described below. In general, a view can be formed through one or more query language statements (e.g., SQL statements), which can operate on data tables and other views.

As explained in Examples 1 and 2, database fields that can potentially give rise to a compliance issue originate at tables at the bottom (a portion of which is shown in FIG. 6) of the branches of the hierarchy. As the query processes towards its root, which serves as output 608, the query elements 604 can perform operations that can affect a compliance analysis.

That is, even if restricted information (e.g., information that is potentially subject to a formalized compliance norm) serves as an input to a query, that does not mean that the information will be provided in the output 608. On the other hand, query operations can also alter the information in a way that the field itself may not be exactly present in the output 608, but the restricted information associated with the field may still be present in the output.

For example, assume that tables 1, 2, and 3 (nodes 612, 614, 616) each include at least one field that includes restricted information (and therefore is a restricted field). Taking first the example of table 1 of node 612, information from the table, including at least one restricted field, is first subjected to a UNION operation in node 620. After the UNION operation, the fields are included in a JOIN operation of node 624, in addition to information in an attribute view of node 628. Finally, the query results obtained after the JOIN of node 624 are projected by node 632 to provide the output 608. If the restricted field was field 1, the following SQL statement at node 632 would cause field 1 not to be included in the output results:

SELECT field 4, field 5 . . .

Because, the projection does not include the restricted field, field 1, the projection node 632 can provide an obfuscation operation, an operation causing the restricted information to no longer appear in the output 608.

As another example, assume that table 2 of node 614 include a restricted field 2. Restricted field 2 is first subjected to a JOIN operation of node 636, and then processed using a SELECT statement of node 640. Assume that the SELECT statement has the form:

SELECT field1, field2*25

The select statement of node 640 has altered the value in field 2. Thus, in at least some cases, the information associated with field 2 may no longer provide restricted information in a sensible form. This SELECT statement of node 640 can also be an obfuscation operation.

Aggregation can also service as an obfuscation operation. Consider again node 640. Rather than the previous SELECT statement, the SELECT statement of node 640 is now:

SELECT field1, SUM(field2)
FROM field3
GROUP BY field1

The restricted information, from restricted field 2, is now presented in a summed, or aggregated form, rather than in its original form. Thus, the aggregation operation of node 640 can serve as an obfuscation operation.

While some SQL operations can obfuscate restricted information, and therefore remove potential compliance issues. Other SQL operations can alter restricted fields without obfuscating restricted information. Left undetected, these operations, referred to as alteration operations, could cause potential compliance issues, even though the restricted field is not exactly included in the output 608.

Returning again to node 640, and field 2 of table 2 as containing restricted information, an example of an alteration operation is a SQL statement that renames a field, such as:

SELECT field2 AS field4

After execution of this statement, the restriction information from table 2 is still potentially provided in the output, even though the information is included in a field with a different name. By merely looking at the output 608 to determine whether a potential compliance issue may exist, it may be erroneously concluded that no compliance issue exists, because field 2 is not included in the results. By analyzing the elements 604, it can be determined that the restricted information is, in fact, included in the output 608, thus giving rise to a potential compliance issue. Altered fields can be further analyzed up the hierarchy to determine whether they are present in the output 608.

Other types of SQL operations that can be alteration operations include concatenation operations, such as:

SELECT field1+field2 AS field6

SQL operations that include wildcard or catchall selections, such as SELECT*, can also include restricted information without being easily detectable from fields in the output 608.

Query operations can be used to define various types of data views. For example, a software program can assist a user in defining views to meet their needs, including, in at least some cases, generating the appropriate SQL query containing the appropriate SQL operations (e.g., SELECT, JOIN, GROUP BY, WHERE, UNION, etc.). FIG. 6 illustrates examples of various types of views. Node 628 provides an attribute view. An attribute view can be used to select attributes (e.g., facts, as opposed to dimensional information) associated with one or more tables.

Node 648 provides an example of an analytic view. An analytic view can be formed from a fact table (e.g. node 652) and, typically, multiple dimension tables (e.g., node 656, which can represent multiple nodes). Analytic views can also be formed from other views, such as attribute views. Analytic views can be useful for categorizing data (e.g., facts, attributes, or measures), and include calculations on the data, and combinations (including aggregations) of the data. Thus, analytic views, and their underlying SQL operations, can include obfuscation operations that may prevent restricted data from being in the output 608, but can also include alteration operations.

Views can also include calculation views, such as the output 608 and node 656. A calculation view can be a combination of two or more of tables, attribute views, analytical views, and other calculation views. In particular, calculation views can provide for more complex data calculation that other types of views. As illustrated in FIG. 6, where the output 608 is a calculation view, calculation views can be complex, and can include many SQL operations, including obfuscation operations and alteration operations.

When a user is defining a view, it can be important for the user to recognize when restricted information may be included in a view. As described above, it can be complicated to analyze a SQL query to determine whether restricted fields accessed by the query statements may produce a potential compliance issue. Thus, the present disclosure can provide a compliance tool to assist a user in analyzing a view (or, more generally, a query) to determine whether a potential compliance issue may exist.

Figure 7:
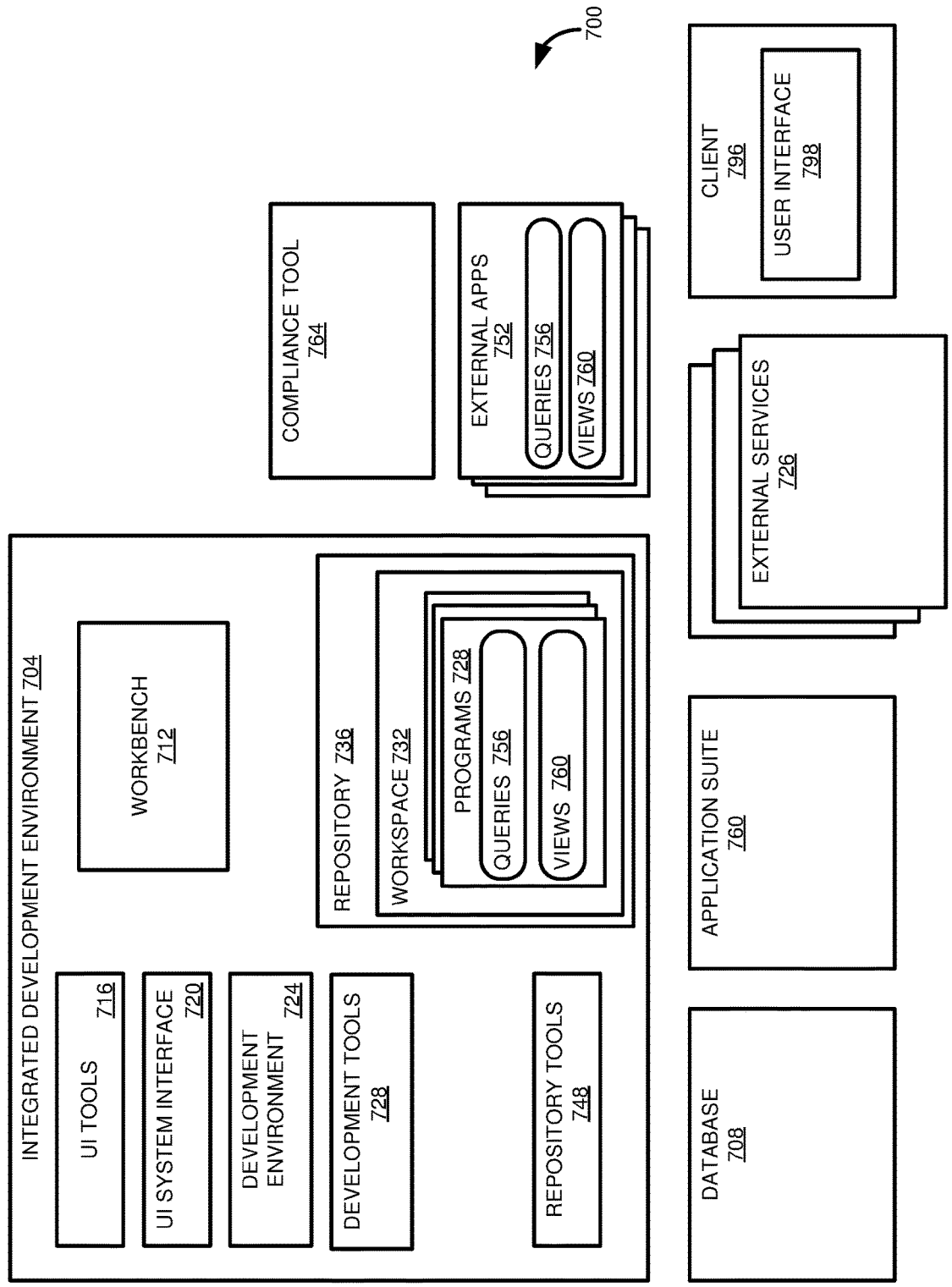
FIG. 7 is a block diagram illustrating an example software architecture in which a compliance tool can interact with an integrated development environment to determine whether a query is likely to raise a potential compliance issue.

Example 6—Example Software Architecture Including Integrated Development Environment Examples 1, 2, and 5 generally describe how database fields and query operations (both of which can be represented as instances of formalized subject matter) can relate to a formalized compliance norm (including its component formalized compliance terms) to determine potential compliance issues. For instance, the fields and operations can be subsumed under one or more formalized compliance terms, which in turn can be used to evaluate one or more formalized compliance norms. FIG. 7 illustrates an example software architecture 700 in which one or more of the disclosed innovations may be implemented.

The architecture 700 can include an integrated development environment 704. The integrated development environment 704 can facilitate the creation, maintenance, and use of programs, including programs that can facilitate the manipulation, retrieval, review, and analysis of data, such as data stored in a database system 708. In a particular example, the database system 708 can be the HANA database system of SAP SE of Walldorf, Germany As will be further described, the integrated development environment 704 can facilitate a determination of what database fields are associated with a query (e.g., a SQL query used to provide a view, such as an attribute view, an analytic view, or a calculation view), operations associated with the query, and whether the database fields and operations may result in a potential compliance issue. In a particular example, the integrated development environment 704 can be the ECLIPSE development environment (Eclipse Foundation, Inc., Ottawa, Canada).

It should be appreciated that the present invention does not require the use of an integrated development environment 704, or any of the components included therein. In some cases, components of the integrated development environment 704, or components providing analogous functionality, can be organized and accessed in another manner. For example, database fields and query components can be determined in another manner, such as using an independent program.

The integrated development environment 704 can include a workbench 712. The workbench 712 can be used to create and modify programs. The integrated development environment 704 can provide user interface tools 716 to facilitate the creation of a graphical user interface for a program and user interface elements. The user interface tools 716 can include the JFACE user interface toolkit (Eclipse Foundation, Inc., Ottawa, Canada). In some cases, the user interface tools 716 can communicate with addition UI components, such as a UI system interface component 720. In a particular example, the UI system interface component 720 can be the Simple Widget Toolkit (Eclipse Foundation, Inc., Ottawa, Canada). SWT can provide widgets and other functionality to interface with a native operating system. JFACE can interface with SWT to simplify programming tasks and to provide a model-based structure for SWT components (including, in some cases, adding logic to SWT elements).

The integrated development environment 704 can provide a development environment component 724 (such as a plugin, such as the plugin development environment (PDE) of Eclipse Foundation, Inc., Ottawa, Canada). The development environment 724 can include tools and scripts to facilitate program development, user interface models, builders, and editors, and application program interface (API) tools (such as to test API compatibility). Program development tools 728 can be included in the integrated development environment 704 to further facilitate programming tasks and program creation. For instance, the program development tools 728 can include editors, compilers, hierarchy computation, code refactoring, and graphical user interfaces to assist in visualizing and editing a program. In a particular example, the program developments tools 728 can include the Java Development Tooling (JDT) of the Eclipse Foundation, Inc., Ottawa, Canada.

One or more programs 728 can be organized in a workspace 732, and the workspace stored in a repository 736. The integrated development environment 704 can include repository tools 748, such as for organizing, searching, and accessing the repository 736.

The integrated development environment 704 can provide a framework for integrating other development tools, which may be stored in the repository 736 (such as internal plugins) or can be external applications (such as external plugins) 752. The external applications 752 can include adapters that allow the workbench 708 to use other programming languages. For example, the ECLIPSE IDE by default supports the JAVA programming language, but can be adapted to use other programming languages, such as C++, using a suitable plugin 752 (or program 728). Plugins 752 can also be used to help create programs that can run in particular operating environments (such as particular operating systems, computing environments (for example, database systems), and application frameworks). As a particular example, SAP SE of Walldorf, Germany, provides a set of ECLIPSE plugins 752 that implement HANA STUDIO, an integrated development environment to create HANA XS or HANA XS2 applications, including applications that can interact with the HANA database system (e.g., the database 708) or the S/4 HANA or S/4 CLOUD PLATFORM frameworks (e.g., an application suite 760).

The external application 752 (or a program 728 in the repository 736) can include tools to assist a user in querying the database 708, including defining queries or database views (e.g., attribute, analytic, or calculation views). For example, such functionality is provided by the HANA STUDIO application of SAP SE of Walldorf, Germany.

A compliance tool 764 can interface with the integrated development environment 704, such as operating as a plugin (which can be an internal or external plugin). The compliance tool 764 can operate the compliance engine 100 of FIG. 1. The compliance tool 764 will be further described in conjunction with FIG. 8 of EXAMPLE 7.

The architecture 700 can include more or fewer components than shown, and may be organized in other manners. For example, functionality of a particular component can be carried out by another component. In addition, in at least some cases, functionality can be carried out using multiple components. In a specific example, all or a portion of the functionality of two or more of the user interface tools 712, the user interface system interface 714, the development environment 716, or the repository tools 748 may be combined, or the functionality of the database 708 and the application suite 760 combined.

Example 7—Example Software Architecture Implementing Compliance Tool

Figure 8:
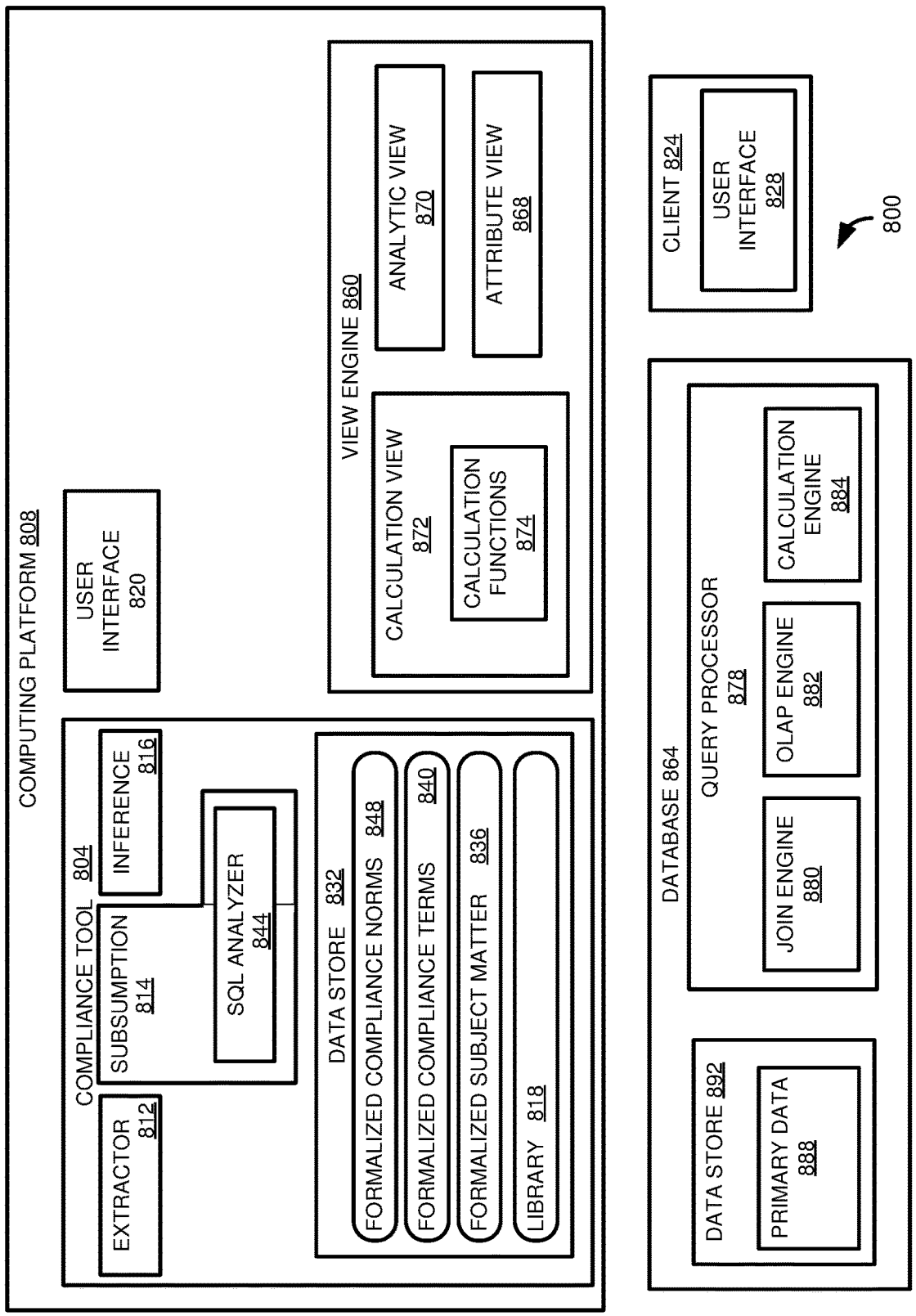
FIG. 8 is a block diagram illustrating an example software architecture in which a compliance tool and a view engine can interact with a database to determine whether a query is likely to raise a potential compliance issue.

FIG. 8 illustrates a software architecture 800 that can be used to implement a compliance tool 804 useable to determine whether database queries (including views constructed at least in part using database query operations) may raise a potential compliance issue. For instance, compliance tool 804 can be the compliance tool 764 of FIG. 7.

The compliance tool 804 can be part of a computing platform 808. The computing platform 808 can be formed from one or more components, such as components (e.g., plugins) interacting through an integrated development environment, such as the integrated development environment 704, more particularly the ECLIPSE integrated development environment. One suitable computing platform 808 is HANA STUDIO, an integrated development environment available from SAP SE of Walldorf, Germany, formed from a set of ECLIPSE plugins.

The compliance tool 804 can implement the compliance engine 110 of FIG. 1. For example, the compliance tool 804 can provide an extractor component 812 (operating the extraction engine 115), a subsumption component 814 (operating the subsumption engine 120), and an inference component 816 (operating the inference engine 125). In a particular case, the extractor component can determine query operations associated with a query, such as determining SQL operations of a SQL query.

In some cases, the extractor component 812 can obtain information from other sources, such as retrieving particular database fields (which can be associated with one or more database tables). The database fields (or database tables) can represent fields known to have the potential to raise potential compliance issues. In other cases, the database fields (or database tables) can represent fields known not to have the potential to raise potential compliance issues. In a particular aspect, a library 818 can be provided that includes both fields known to have the potential to raise compliance issues and fields known not to have the potential to raise compliance issues.

In a further aspect, in place of, or in addition to, automatically obtaining program information (database tables and fields thereof), the information can be supplied by another source, including user input. User input can be received from a user interface component 820, which can communicate with a client computing system 824, which can operate a user input component 828. A user may specify one or more database tables, and one or more fields thereof, that the user believes may raise potential compliance issues if the information is included in the output of a query (including through a database view).

The information regarding database tables, database fields, and query operations (and optionally other formalized subject matter associated with a query, such as program elements of a program utilizing the query results) can be stored in a data store 832 of the compliance tool 804. For example, the information regarding database fields and query operations can be stored as instances of formalized subject matter 836. The instances of formalized subject matter 836 associated with a query can then be processed by the subsumption component 814. Query operations, and the database fields on which they operate, can be analyzed to determine whether they can be subsumed under any formalized compliance terms 840 stored in the data store 832 and accessible by the subsumption component 814.

The subsumption component 814 can operate a SQL analyzer 844 (or other type of query analyzer). The SQL analyzer 844 can cooperate with other components of the architecture 800 to determine whether database fields and the SQL operations carried out with them may give rise to a potential compliance issue. The SQL analyzer 844 can determine whether particular SQL operations are obfuscation operations or alteration operations, and update a compliance hypothesis accordingly.

In some cases, because certain database fields are known to have the potential to raise compliance issues, a compliance hypothesis can initially be set to TRUE. That is, it is assumed that a compliance issue may be raised. The SQL analyzer 844 can then traverse a query hierarchy to determine if any of the nodes connected to input that includes the database fields carry out obfuscation operations, in which case the compliance hypothesis can be set to FALSE (such as by ANDing the compliance hypothesis with FALSE). If any of the database fields are processed using an alteration operation, the altered database fields can be analyzed in addition to the original database fields.

An example algorithm for traversing a query hierarchy is:

an ontology or schema element as part of the operation of the extractor component 812. In turn, the information can be attached to any formalized compliance terms under which the instances are subsumed by the subsumption component 814.

After the database fields, query operations, or other formalized subject matter 836 have been processed by the subsumption component 814, the subsumption results 840 can be analyzed by the inference component 816. For example, the inference component 816 can apply one or more compliance rules related to formalized compliance norms 848 of the data store 832 (e.g., relationships between formalized compliance terms) to the subsumption results 840 to determine whether a compliance issue may exist. The compliance tool 804 can provide information regarding any

```
bool view_is_critical (node)
{
    bool result = TRUE
    bool state = FALSE
    for (each field in sensible fields) //sensible fields are fields identified as potentially
            //giving rise to a compliance issue
        {
            switch 'field'
            {
                case field occurs directly in node; result = result & TRUE;
                case field is processed using an obfuscation operation//such as aggregation
                    //or projection operations, or if a field value is changed or transformed
                    result = result & FALSE
                case field is processed using an alteration operation //such as rename,
                        //concatenate, or mass select
                        result = result & TRUE;
                    if (field name changed)
                    {
                        add new field name to group of sensible fields
                    }
                    if (mass select)
                    {
                        add select results to group of sensible fields
                    }
                case field does not occur in node
                    if (node has no subnodes)
                        {
                            result = result & FALSE
                        }
                    else
                        for (each subnode of node)
                        {
                            state = state OR view_is_critical(subnode)//recursively call function
                                //for subnodes
                            result = result & state
                        }
                default
                    result = result & FALSE
            }
        }
}
return result
```

At least certain database fields, query operations, or other instances of formalized subject matter 836 can be mapped to one or more of the formalized compliance terms 840 directly, or indirectly using a schema or ontology. Mapping the instances of formalized subject matter 836 to formalized compliance terms using the subsumption component 814 can help ensure that terminology differences in the sources of formalized subject matter (e.g., particular database field names or types of query operations (or query operations specified in different computing languages) are harmonized in conducting a compliance analysis (e.g., harmonized to a common schema/ontology, which is then subsumed under formalized compliance terms). Information regarding instances of the formalized subject matter 836, such as a database field name or a query operation, can be attached to potential compliance issues to a user (e.g., using the user interface 828 of the client computing system 824), such as using the example displays of FIG. 4 or 5.

The computing platform 808 can include a view engine 860. The view engine 860 can provide functionality for defining and executing views or queries. The view engine 860 can be in communication with the compliance tool 804, such as with the SQL analyzer 844. The view engine 860 can also be in communication with a database system 864, which can be the database system 708 of FIG. 7.

The view engine 860 can provide for the creation and execution of attribute views 868, analytic views 870, and calculation views 872. The calculation views 872 can use calculation functions 874 (such as to operate on database tables or other views). The view engine 860 can communicate with a query processor 878 of the database system 864. The query processor 878 can include a join engine 880 (for performing JOIN operations to generate attribute views 868), an OLAP engine 882 (to combine a fact table with multiple dimension tables or other views to generate an analytic view 870), and a calculation engine 884 (to execute calculation functions 874 and to combine data from database tables and other views, including other calculation views, analytic views, or attribute views).

In executing query operations, the query processor 878 can access data 888 (e.g., database tables, which can include the database fields being analyzed) of a data store 892 (for example, data stored in a row store or a column store of the database system 864).

The architecture 800 can include more or fewer components than shown, and may be organized in other manners. For example, functionality of a particular component can be carried out by another component, or functionality of components can be combined.

Example 8—Example Compliance Determination Using Query Analysis

Figure 9:
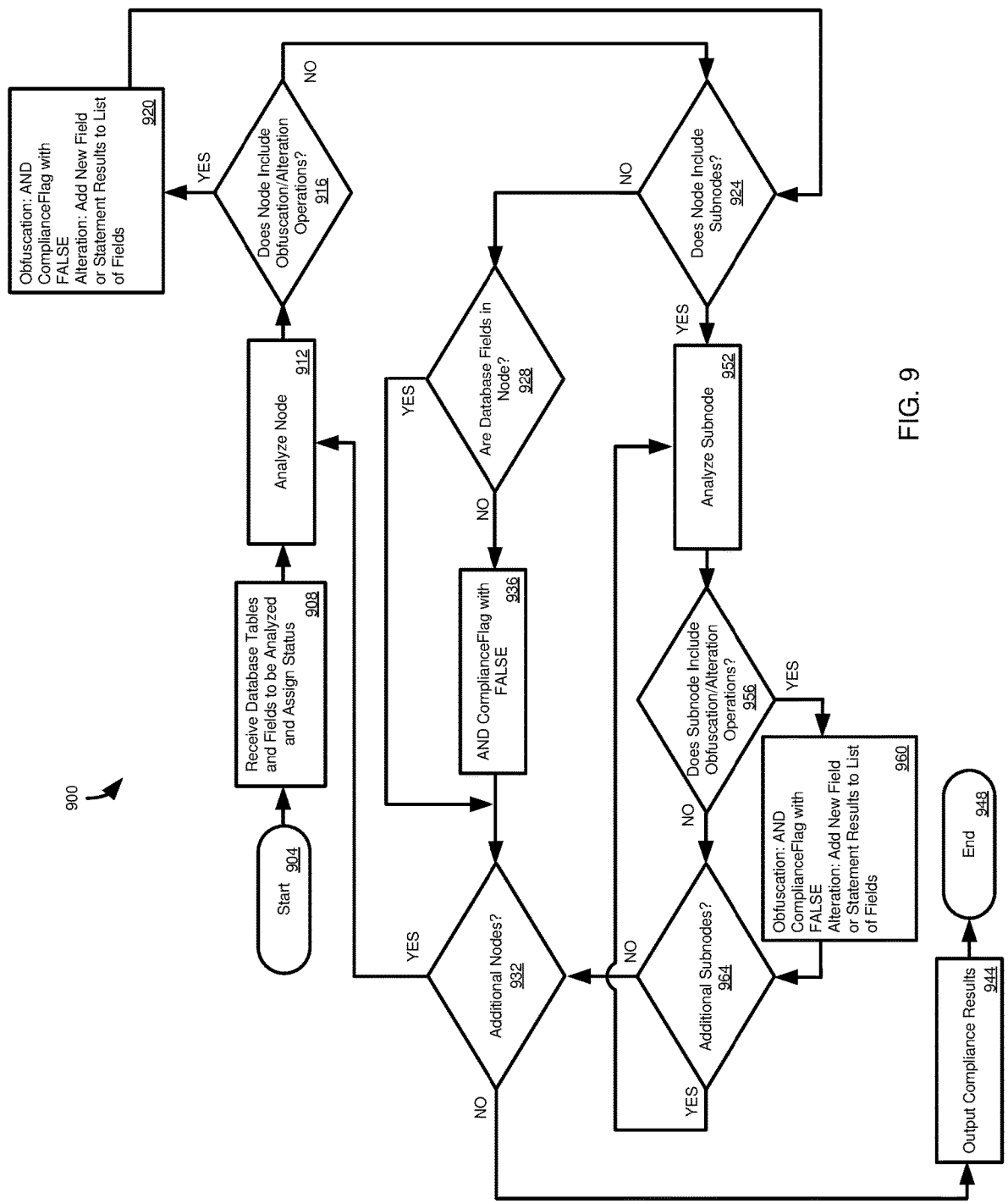
FIG. 9 is a flowchart of a method for presenting to a user compliance information obtained by analyzing a query.

FIG. 9 illustrates a flowchart of an example method 900 for carrying out a compliance determination by analyzing a query, such as a query providing a database view. In particular aspects, the method 900 can be carried out using the architecture 800 shown in FIG. 8 and described in Example 7. The method 900 begins at 904. At 908, one or more database fields of one or more database tables are received. In some cases, the database fields and database tables can be provided by a user. For example, a user may provide a list of database fields of database tables that may contain restricted information. Or, a user can be presented with a list of database fields used in a query, and a user can provide an indication of which fields may include restricted information.

In a further aspect, the one or more database fields can determined by comparing database fields and tables accessed by a query to a library of database fields (such as the library 818 of FIG. 8). The database fields in the library can be database fields known to potentially give rise to a compliance issue. If a database field is in the library, it can be selected for further analysis using the method 900. The database fields in the library can be database fields known not to give rise to a compliance issue. In this case, any database fields in the query that are not in the library can be selected for further analysis using the method 900. Or, such database fields can be presented to a user, and a user can determine which database fields should be further analyzed.

With the database fields to be analyzed having been determined, in at least some implementations, the fields can be assigned an initial status, such as whether the database fields have the potential to raise a compliance issue. The status can be represented by a flag or Boolean variable set initially to TRUE. The query can then be further analyzed.

The query can be represented as a plurality of nodes in a hierarchical relationship, with nodes being related to other nodes (such as in parent-child relationships). A first node of the query is analyzed at 912. Typically, nodes are analyzed starting from the bottom of the hierarchy (representing the inputs, having the database fields to be analyzed). The database fields are analyzed up through the hierarchy to determine whether they are included in the root node of the hierarchy, representing the output of the query (which can be a database view).

At 916, it is determined whether the query node analyzed at 912 includes any obfuscation operations or alteration operations, such as using the SQL analyzer 844 of FIG. 8. If it does, the method 900 proceeds to 920. At 920, for any database fields subject to an obfuscation operation, the status of the field is updated to reflect that the database field no longer has the potential to raise a compliance issue. For instance, the flag or Boolean variable can be ANDed with FALSE. For any database fields subject to an alteration operation, if a new field is created (such as if the original field is renamed, the original field is concatenated with text and/or other field names, or the data associated with the original field is otherwise associated with a new field name), the new field name can be added to the group of database fields potentially giving rise to a compliance issue. If the operation is a generic selection (e.g., using a wildcard operator), the entire results of the statement can be flagged as potentially giving rise to a compliance issue and further analyzed through the hierarchy to the root node/output.

If no obfuscation or alteration operations were associated with the node in decision 916, or after such operations were accounted for at 920, the method proceeds to 924. At 924 it is then determined whether the node being analyzed includes any subnodes, which can be parent nodes or child nodes. If the node being analyzed does not include any subnodes, the method proceeds to decision 928 where it is determined whether the particular database fields being analyzed appear in the query operation of the node being analyzed. For any database fields that do appear, the method proceeds to decision 932. For any database fields that do not appear, the method 900 proceeds to 936, where the flag or Boolean variable representing the status of the database field is set to indicate that a potential compliance issue no longer exists, such as by ANDing the flag or variable with FALSE. The method 900 then proceeds to decision 932.

At 932, it is determined whether the query contains any additional nodes. If so, the method 900 proceeds to analyze the next node at 912. If it is determined at 932 that the query does not include additional nodes, the method 900 proceeds to 944, where compliance results are output, such as by the inference component 816 of FIG. 8. The compliance results can include an indication of the compliance status (e.g., value of the flag or Boolean variable) for each of the database fields. In addition, or alternatively, the compliance results can present an overall compliance status for the query, such as by ORing the compliance status of each of the database fields being analyzed. Thus, if any of the compliance flags are true, a potential compliance issue will be indicated. The compliance results can also present the status of the compliance flags or variables with respect to one or more formalized compliance norms, where the database fields and their flags or variable status have been subsumed under one or more formalized compliance terms. The method 900 can then end at 948.

If, at 924, it was determined that the node being analyzed has subnodes, the method 900 can proceed to analyze the subnode at 952. At decision 956, it is determined whether the subnode has any obfuscation or alteration operations. If so, the method 900 proceeds to 960, where the obfuscation or alteration operations are handled as described for 920. Once any database fields have been treated at 960, or if no obfuscation operations were identified at 956, the method 900 proceeds to decision 964. At 964, it is determined whether there are additional subnodes (parent or child nodes) of the subnode being analyzed, or of the originally analyzed node. If additional subnodes are present, the method 900 returns to 952 to analyze the next subnode. If no additional subnodes are present, the method 900 returns to 940 to determine whether the query contains additional nodes to be analyzed.

The method 900 can provide a number of advantages. It can be difficult to determine whether a query will output restricted information, which could lead to a potential compliance issue, as queries can involve many complex operations. The method 900 can facilitate and automate such a determination, speeding the process and increasing its accuracy.

Once it is determined whether restricted information is included in query output, it can be difficult to determine whether the output of restricted information may lead to potential compliance issues. The method 900 can also facilitate and automate this process, such as by including query operations and database fields as instances of formalized subject matter, subsuming the instances under one or more formalized compliance terms, and then using the formalized compliance terms to analyze one or more formalized legal norms. This methodology can make it easier for users to understand whether a potential compliance issue exists, as well as its source, for many different formalized compliance norms in a single process.

Example 9—Computing Systems

Figure 10:
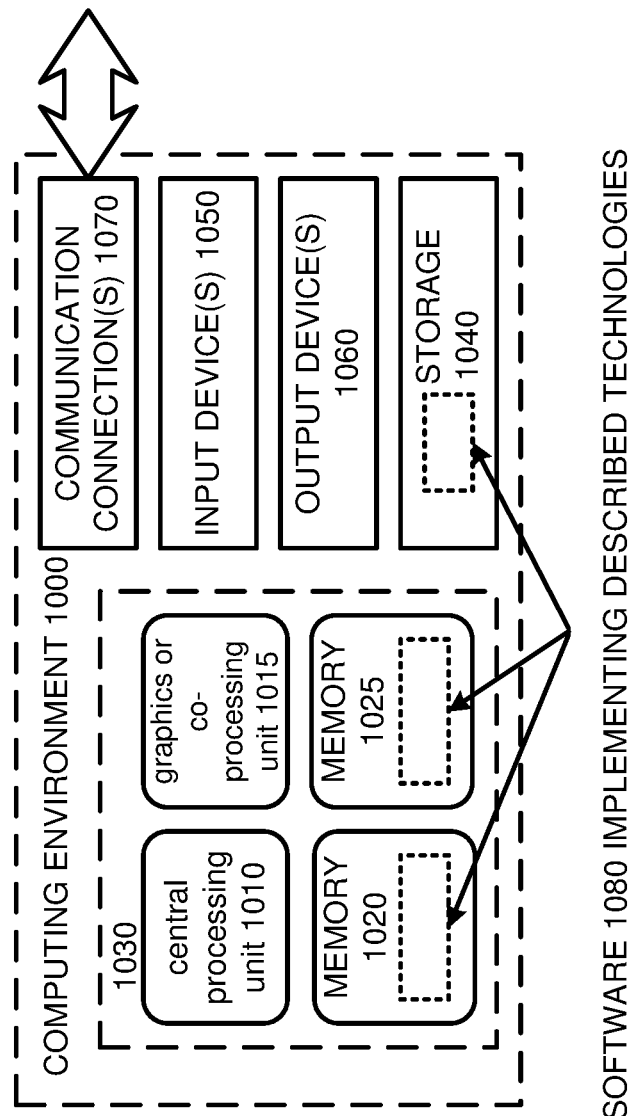
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing components of the framework 100 of FIG. 1 or the architecture 800 of FIG. 8, including the extractor component 812, the subsumption component 814, and the inference component 816. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015. The memory 1020, 1025, may also store database data, such as data associated with the database system 864 of FIG. 8.

A computing system 1000 may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 11:
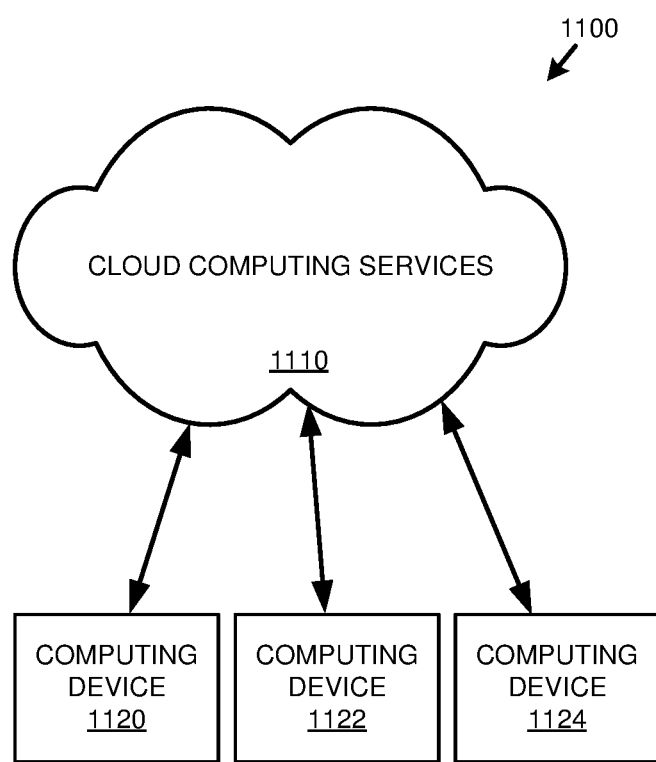
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system configured to perform processing to analyze whether a query may create a compliance issue, the computing system comprising:
one or more memories;
one or more hardware processing units coupled to the one or more memories; and
one or more computer readable storage media storing instructions that, when executed, cause the computing system to perform operations comprising:
with a software development tool, receiving a query comprising a plurality of query operations;
representing the query as a sequential arrangement of the plurality of query operations, the plurality of query operations comprising at least one retrieval operation to retrieve data from a first field of a first database table, the first field having a first field name, and at least one processing operation that is carried out using data retrieved in response to the at least one retrieval operation, wherein the plurality of query operations comprise at least two query operations in a hierarchical relationship;
receiving at least one database field name potentially associated with a potential compliance issue;
determining that the at least one database field name corresponds to the first field name;

determining a relationship between the at least one database field and at least one query operation of the plurality of query operations;

subsuming the at least one database field and the at least one query operation under at least one formalized compliance term based on the relationship;

determining whether the at least one processing operation comprises:

(1) one or more obfuscation operations, wherein an obfuscation operation of the one or more obfuscation operations comprises an aggregation operation, a projection operation, a value change operation, or a transformation operation;

(2) one or more alteration operations that associate data in query results produced by the query, when executed, with a name different than the first field name, wherein an alteration operation of the one or more alteration operations comprises renaming the first field name, a mass select operation, or a concatenation operation concatenating the first field name with a name of at least a second field;

determining compliance results based at least in part on whether the at least one processing operation comprises one or more obfuscation operations or one or more alteration operations, the determining compliance results comprising:

(1) for at least one alteration operation of any alteration operations of the at least one processing operations, setting or maintaining a status identifier to indicate a potential compliance issue; and (2) for at least one obfuscation operation of any alteration operations of the at least one processing operations, setting or maintaining a status identifier to not indicate a potential compliance issue; and outputting to a user the compliance results through the software development tool.

2. The computing system of claim 1, wherein determining whether the at least one processing operation comprises one or more obfuscation operations or one or more alteration operation comprises determining that the at least one processing operation comprises one or more obfuscation operations and one or more alteration operations.

3. The computing system of claim 1, the operations further comprising:

receiving user input providing the received at least one database field name.

4. The computing system of claim 1, the operations further comprising:

receiving input associating the compliance results with at least one category of formalized compliance norms.

5. The computing system of claim 1, wherein a query operation comprises an element of a formalized subject matter schema.

6. The computing system of claim 1, the operations further comprising;

subsuming a query operation and the at least one database field under at least one formalized compliance term.

7. The computing system of claim 6, the operations further comprising;

associating the at least one formalized compliance term with at least one formalized compliance norm, the compliance results comprising the at least one formalized compliance norm.

8. The computing system of claim 1, the operations further comprising:

determining a relationship between the at least one database field and at least one query operation of the plurality of query operations;

classifying the at least one database field and the at least one query operation as an instance of a formalized subject matter element based on the relationship.

9. The computing system of claim 1, the operations further comprising:

changing a status identifier associated with the at least one database field if the at least one processing operation comprises an obfuscation operation.

10. The computing system of claim 1, the operations further comprising:

determining that the at least one processing operation comprises an alteration operation; determining whether the alteration operation associates data associated with the at least one database field with at least a second database field; and analyzing the at least a second database field to determine whether data associated with the at least a second database field is an output of the query.

11. The computing system of claim 1, the operations further comprising:

determining that the at least one query operation comprises an alteration operation; determining whether the alteration operation comprises a generic selection, providing selection results, of data comprising data associated with the at least one database field in the selection results; and determining if an output of the query comprises the selection results.

12. The computing system of claim 1, wherein receiving at least one database field comprises:

determining a plurality of database fields processed using the query; comparing the plurality of database fields with a library; and selecting the at least one database field based on the comparing.

13. The computing system of claim 12, wherein the library comprises database fields known to potentially raise a compliance issue and the at least one database field is selected if it is in the library.

14. The computing system of claim 12, wherein the library comprises database fields known not to potentially raise a compliance issue and the at least one database field is selected if it is not in the library.

15. One or more computer-readable storage media comprising computer executable instructions that implement a compliance tool, the one or more computer-readable storage media comprising:

receiving a query comprising a plurality of query operations;

computer-executable instructions that, when executed by a computing system comprising at least one hardware processor and at least one memory, cause the computing system to determine the plurality of query operations associated with the query;

determining database field names associated with the query operations, wherein the query operations comprise at least two query operations in a hierarchical relationship;

computer-executable instructions that, when executed by the computing system, cause the computing system to determine a plurality of database fields processed using the query;

computer-executable instructions that, when executed by the computing system, cause the computing system to compare the plurality of database fields with a library;

and selecting the at least one database field based on the comparing;

computer-executable instructions that, when executed by the computing system, cause the computing system to determine a relationship between the at least one database field and at least one query operation of the plurality of query operations;

computer-executable instructions that, when executed by the computing system, cause the computing system to classify the query operations and the database field name as instances of formalized subject matter;

computer-executable instructions that, when executed by the computing system, cause the computing system to subsume at least a portion of the instances of formalized subject matter under at least one formalized compliance term, the subsuming comprising determining whether one or more query operations of the determined query operations on a given database field name of the determined database names are alteration operations that associate data in query results produced by the query, when executed, with a name different than the field name of the given database field;

computer-executable instructions that, when executed by the computing system, cause the computing system to analyze the at least one formalized compliance term using at least one formalized compliance norm comprising the at least one formalized compliance term;

computer-executable instructions that, when executed by the computing system, cause the computing system to associate the at least one formalized compliance term with at least one formalized compliance norm, the compliance results comprising the at least one formalized compliance norm; and computer-executable instructions that, when executed by the computing system, cause the computing system to output for display a visual representation of the formalized compliance norm and associated formalized compliance term.

16. A method, implemented in a computing system comprising a memory and one or more hardware processors, of evaluating a potential compliance issue associated with at least one formalized compliance norm, the method comprising:

receiving a query comprising a plurality of query operations;

determining the plurality of query operations associated with the query, at least a portion of the query operations being hierarchically related;

determining at least one database field name associated with the query and comprising restricted information;

calculating compliance results, the compliance results indicating whether query operations using the restricted information produce output comprising the restricted information, the calculating compliance results comprising:

analyzing query operation types of the plurality of query operations hierarchically connected to a query operation of the plurality of query operations to retrieve information from a database field having the at least one database field name to determine whether such hierarchically connected query operations are of a type that obfuscate information retrieved from the at least one database field having the at least one database field name;

classifying the query operations and the database field name as instances of formalized subject matter;

determining a plurality of database fields processed using the query;

comparing the plurality of database fields with a library; and selecting the at least one database field based on the comparing;

for one or more operations of any operations of operations that obfuscate information retrieved from the at least one database field having the at least one database field name, setting or maintaining a compliance result to not indicate a potential compliance issue;

changing a status identifier associated with the at least one database field if the at least one processing operation comprises an obfuscation operation;

and outputting for display a visual representation of the compliance results.

17. The computing system of claim 1, wherein the at least one processing operation is hierarchically related to at least a second processing operation, the operations further comprising:

determining that the at least a second processing operation is related to the at least one processing operation; and determining whether the at least a second processing operation alters or obfuscates data associated with the at least one database field name.

18. The method of claim 16, wherein the library comprises database fields known to potentially raise a compliance issue and the at least one database field is selected if it is in the library.

19. The method of claim 16, wherein the library comprises database fields known not to potentially raise a compliance issue and the at least one database field is selected if it is not in the library.

* * * * *